US012716232B2

(12) United States Patent
Krarti

(10) Patent No.: US 12,716,232 B2
(45) Date of Patent: Aug. 25, 2026

(54) DYNAMIC INSULATION SYSTEM FOR SWITCHABLE BUILDING ENVELOPE

(71) Applicant: The Regents of the University of Colorado, a body corporate, Denver, CO (US)

(72) Inventor: Moncef Krarti, Longmont, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 625 days.

(21) Appl. No.: 17/631,089

(22) PCT Filed: Jul. 29, 2020

(86) PCT No.: PCT/US2020/044001
§ 371 (c)(1),
(2) Date: Jan. 28, 2022

(87) PCT Pub. No.: WO2021/021884
PCT Pub. Date: Feb. 4, 2021

(65) Prior Publication Data

US 2022/0251827 A1 Aug. 11, 2022

Related U.S. Application Data

(60) Provisional application No. 62/879,655, filed on Jul. 29, 2019.

(51) Int. Cl.
*E04B 1/76* (2006.01)
*E04B 1/74* (2006.01)
(Continued)

(52) U.S. Cl.
CPC .................. *E04B 1/76* (2013.01); *E04B 1/74* (2013.01); *E04C 2/34* (2013.01); *E04C 2/525* (2013.01);
(Continued)

(58) Field of Classification Search
CPC ..... E04B 1/74; E04B 1/76; E04C 2/34; E04C 2/525; F24S 20/66; Y02A 30/272; Y02B 10/20; Y02E 10/40
(Continued)

(56) References Cited

U.S. PATENT DOCUMENTS 3,243,117 A 3/1966 Morgan
8,726,586 B1 * 5/2014 Stevens ................ F24F 11/0001 52/302.1

(Continued)

FOREIGN PATENT DOCUMENTS

DE 4033276 A1 4/1992
JP 2002309689 A 10/2002
WO 2015021525 A1 2/2015

OTHER PUBLICATIONS

Sun Hwa Lee, "International Preliminary Report on Patentability Regarding International Application No. PCT/US2020/044001", Feb. 10, 2022, p. 8, Published in: CH.

(Continued)

*Primary Examiner* — James J Buckle, Jr.
(74) *Attorney, Agent, or Firm* — Meunier Carlin & Curfman LLC

(57) ABSTRACT

This disclosure describes systems, methods, and apparatus for a structural insulation assembly having a variable insulating value and being incorporated into a thermal envelope of a structure, the assembly comprising a first and second surface; a cavity between the first and second surfaces and at least partially filled with a gas; a plurality of insulating elongated fins fixed to distinct rotational axes parallel to each other, the plurality of elongated fins being continuously rotatable between a closed position, where the plurality of elongated fins are substantially vertical, and a fully open position, where the plurality of elongated fins are perpendicular to the first and second surfaces and parallel to each (Continued)

Partially-Open Insulation Layers
(lower R-value)

other; an actuator for controlling a rotational angle of the insulating elongated fins to effectuate the variable insulating value; and a controller configured to pass instructions to the actuator dictating the angle of the insulating elongated fins.

10 Claims, 26 Drawing Sheets

(51) Int. Cl.
*E04C 2/34* (2006.01)
*E04C 2/52* (2006.01)
*F24S 20/66* (2018.01)

(52) U.S. Cl.
CPC ............ *F24S 20/66* (2018.05); *Y02A 30/272* (2018.01); *Y02B 10/20* (2013.01); *Y02E 10/40* (2013.01)

(58) Field of Classification Search
USPC ........................................................ 52/404.1
See application file for complete search history.

(56) References Cited

U.S. PATENT DOCUMENTS

| | | | | |
|---|---|---|---|---|
| 9,735,083 | B1 | 8/2017 | Bodenweber et al. | |
| 2002/0124992 | A1 | 9/2002 | Rainer et al. | |
| 2009/0173375 | A1* | 7/2009 | Frazier .................... | F24S 10/30 136/246 |
| 2010/0326606 | A1* | 12/2010 | Barkman ................ | E06B 9/386 160/188 |
| 2015/0219344 | A1* | 8/2015 | Glover .................. | E06B 3/6612 165/59 |
| 2016/0123000 | A1 | 5/2016 | Voegele, Jr. et al. | |
| 2023/0020511 | A1* | 1/2023 | Hsu ......................... | F28F 13/18 |
| 2024/0113527 | A1* | 4/2024 | Ratz ........................ | H02J 3/381 |

OTHER PUBLICATIONS

Shane Thomas, “International Search Report and Written Opinion Regarding International Application No. PCT/US2020/044001”, Feb. 24, 2021, p. 11, Published in: US.

* cited by examiner

Partially-Open Insulation Layers (lower R-value)

Closed Insulation Layers (high R-value)

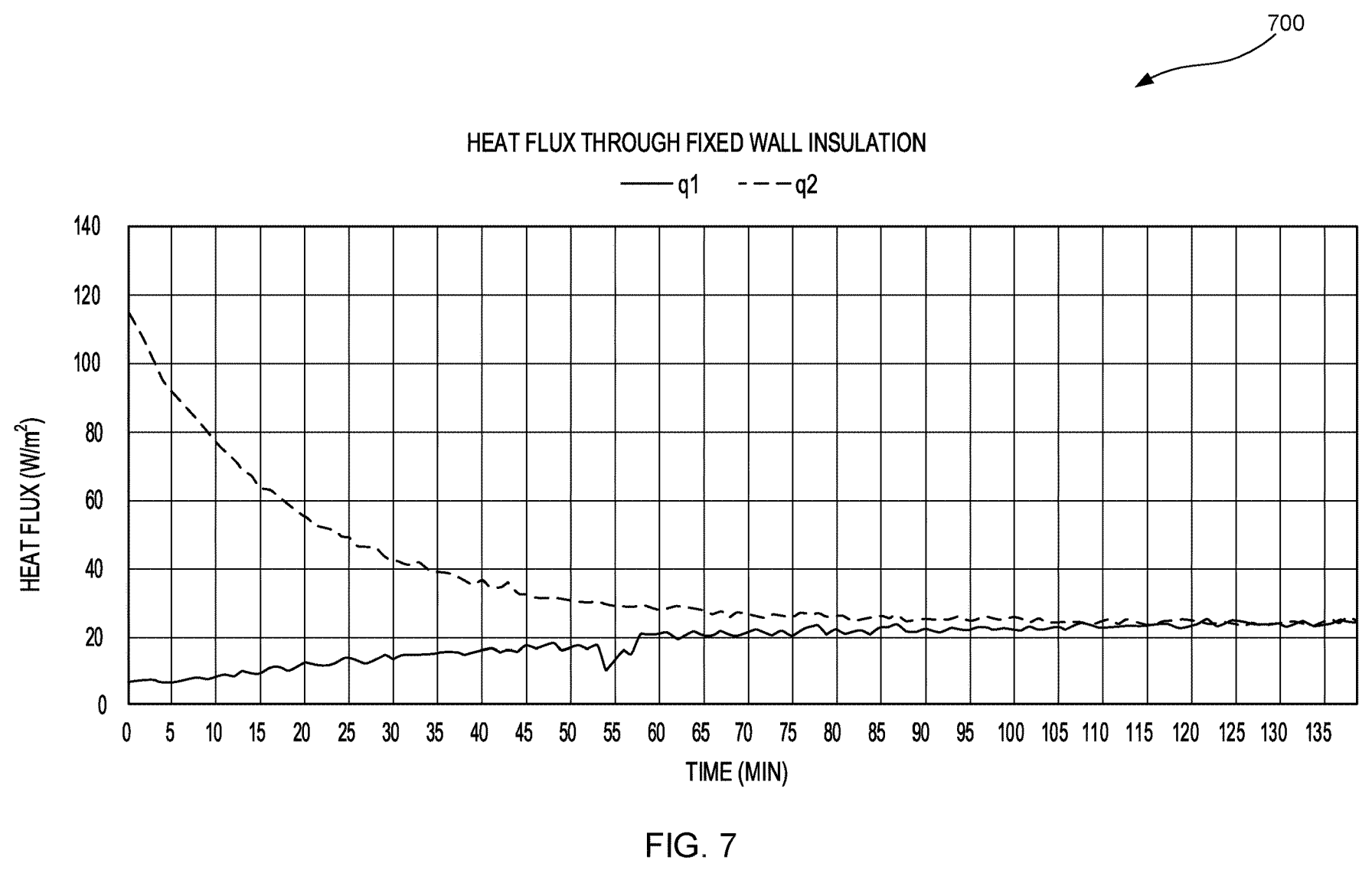

700

HEAT FLUX THROUGH FIXED WALL INSULATION

—— q1 - - - q2

HEAT FLUX (W/m²)

0 20 40 60 80 100 120 140

0 5 10 15 20 25 30 35 40 45 50 55 60 65 70 75 80 85 90 95 100 105 110 115 120 125 130 135

TIME (MIN)

FIG. 7

902
Heat gain through structure
Heat loss through structure
R-Value [m2-K/W]
Direction of heat flow through envelope structure
Lower thermal resistance (Cooling operation)

901
Higher thermal resistance (Heating operation)
Heat gain through structure
Heat loss through structure
R-Value [m2-K/W]
Direction of heat flow through envelope structure

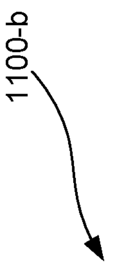
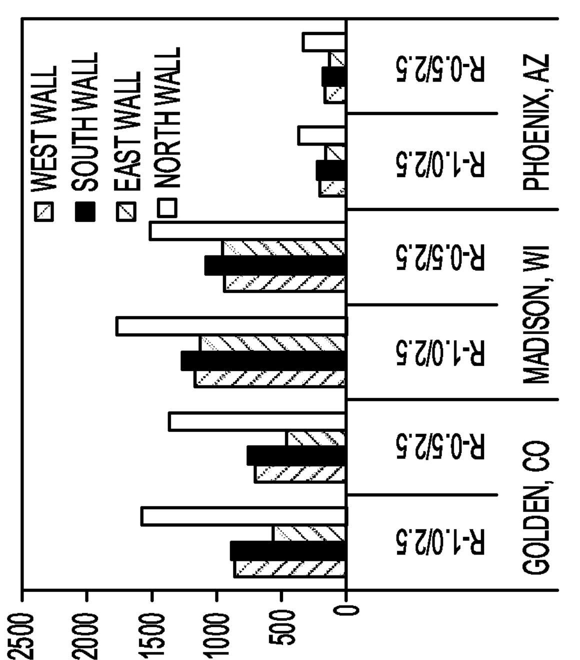
FIG. 11B
1100-a
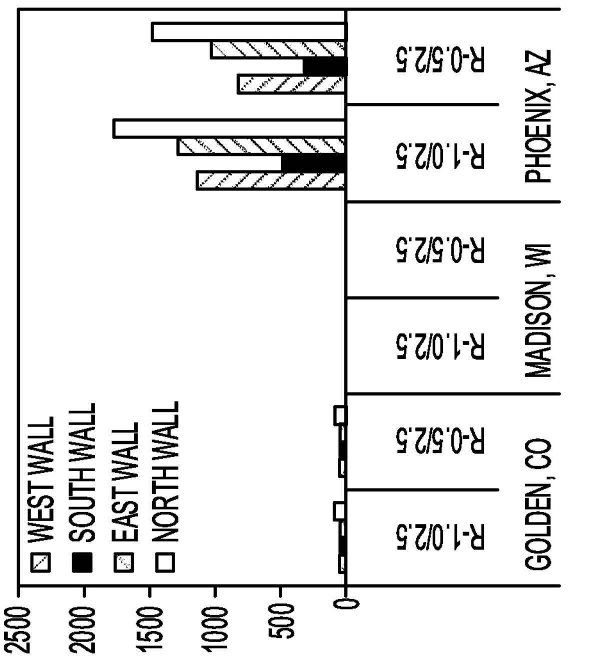
FIG. 11A

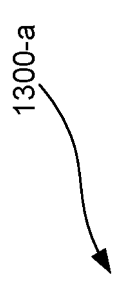
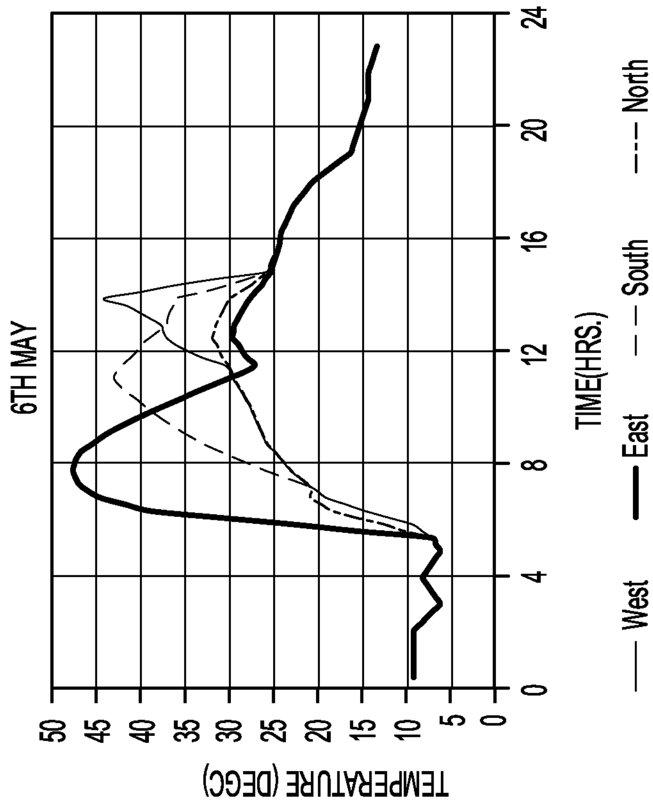
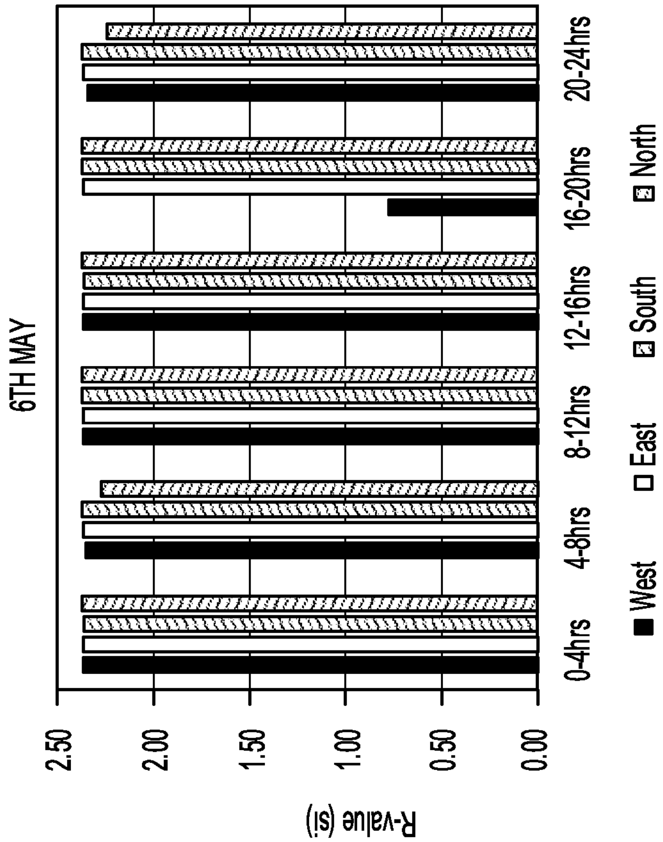
FIG. 13A

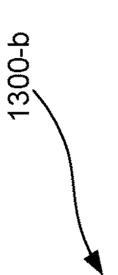
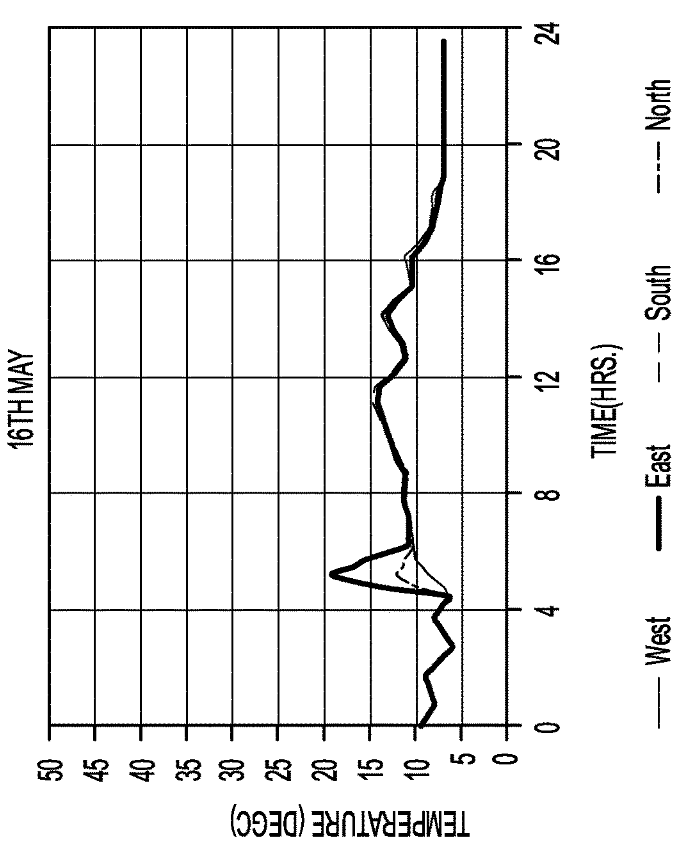
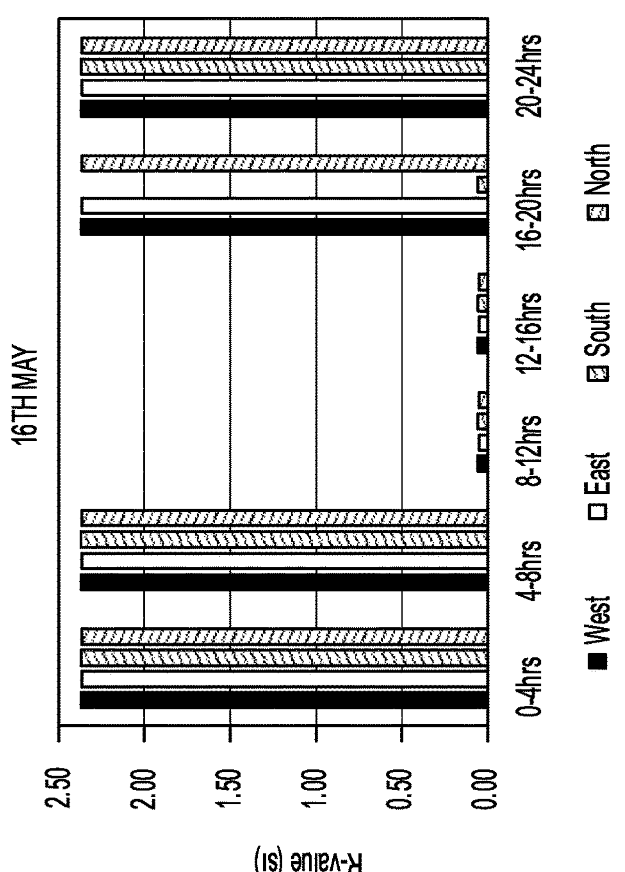
FIG. 13B 1300-c

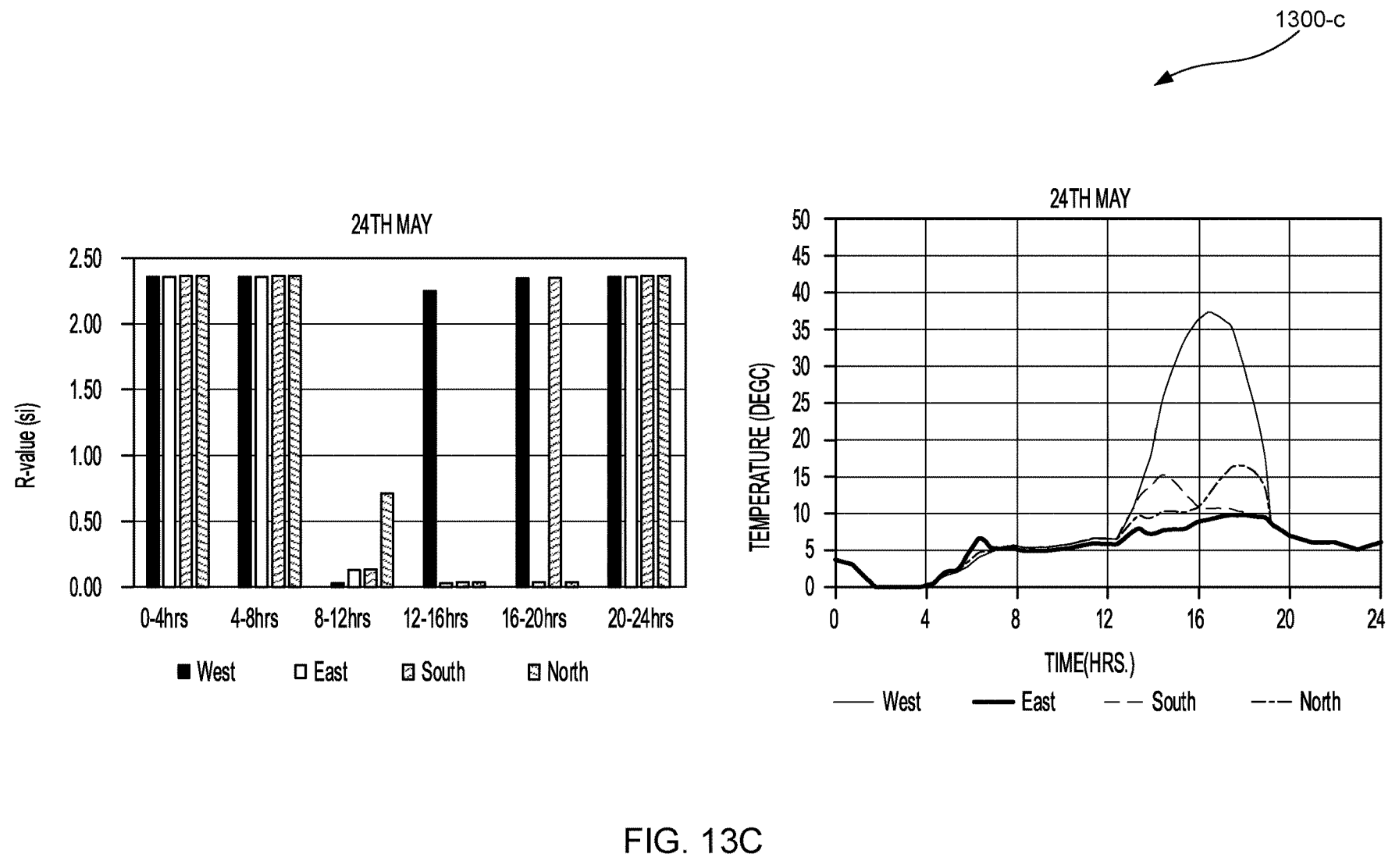

24TH MAY

TEMPERATURE (DEGC)

50 45 40 35 30 25 20 15 10 5 0

0 4 8 12 16 20 24

TIME(HRS.)

West East South North

24TH MAY

R-value (si)

2.50 2.00 1.50 1.00 0.50 0.00

0-4hrs 4-8hrs 8-12hrs 12-16hrs 16-20hrs 20-24hrs

West East South North

FIG. 13C

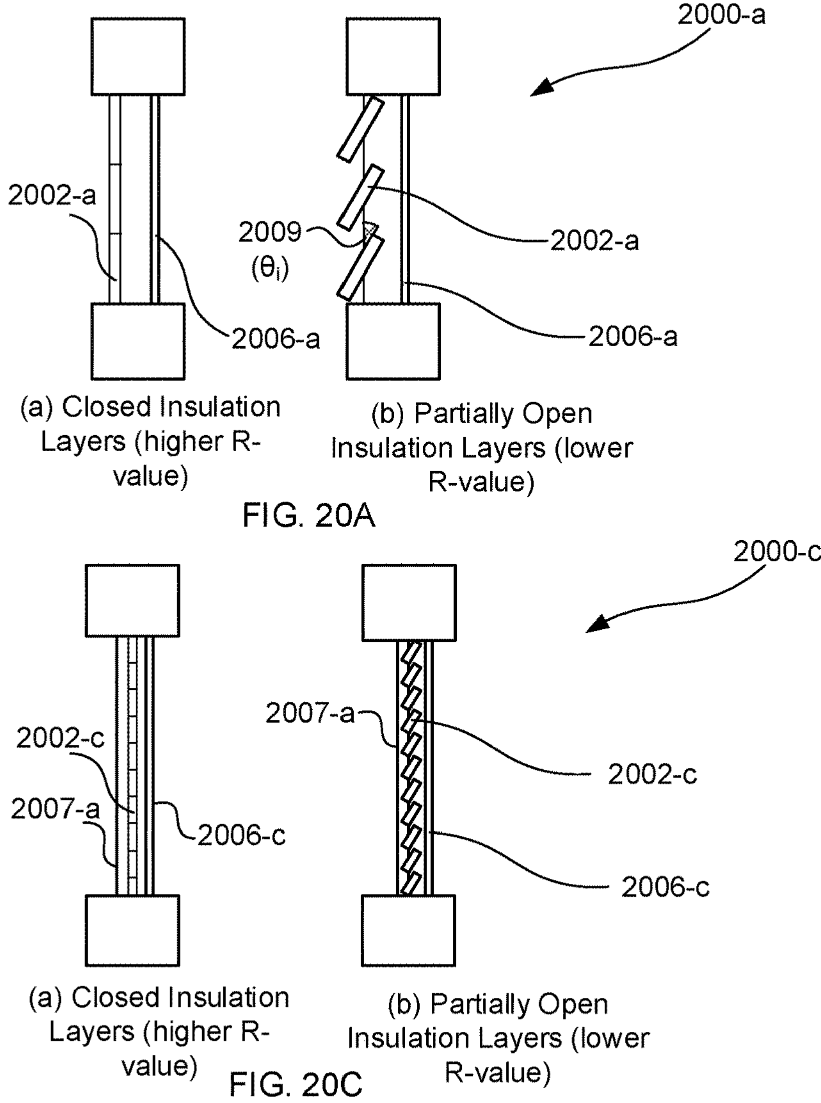
2000-a
2002-a
2006-a
2009 ($\theta_i$)
2002-a
2006-a
(a) Closed Insulation Layers (higher R-value)
(b) Partially Open Insulation Layers (lower R-value)
FIG. 20A
2000-c
2002-c
2007-a
2006-c
2007-a
2002-c
2006-c
(a) Closed Insulation Layers (higher R-value)
(b) Partially Open Insulation Layers (lower R-value)
FIG. 20C

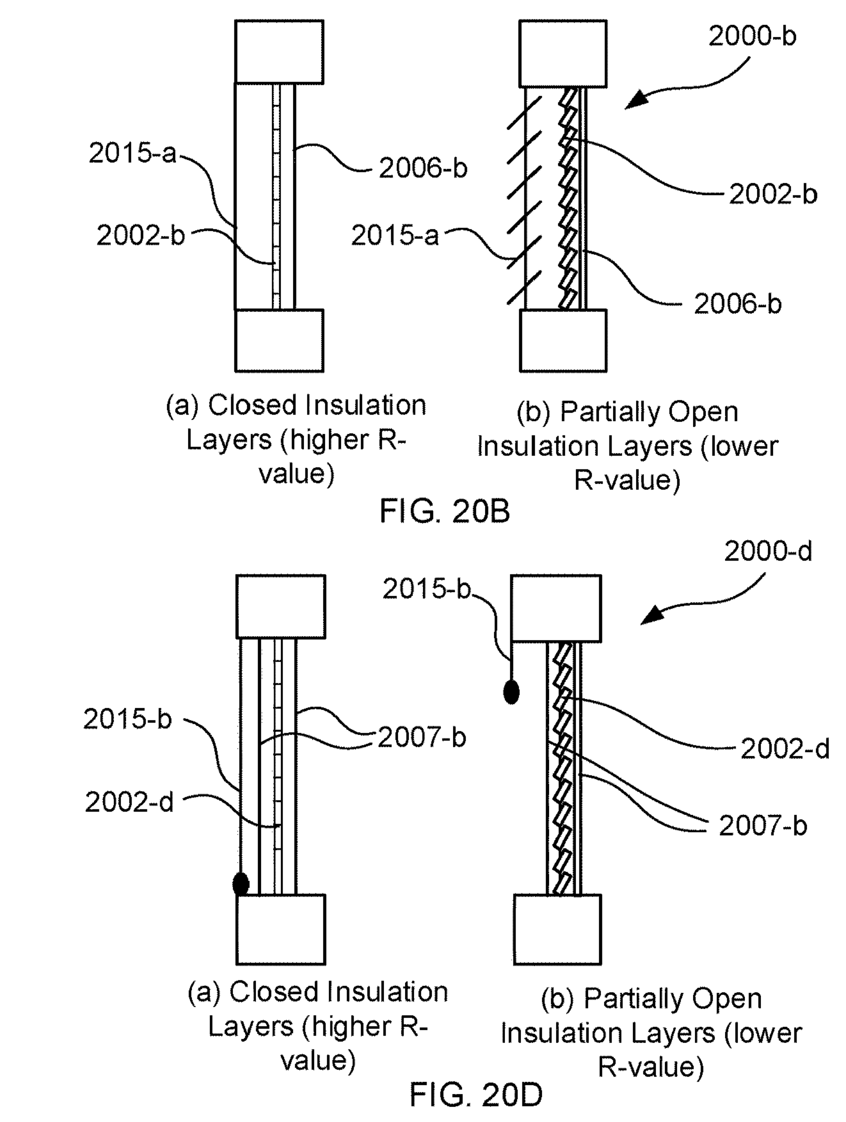
2000-b
2015-a
2002-b
2006-b
2015-a
2002-b
2006-b
(a) Closed Insulation Layers (higher R-value)
(b) Partially Open Insulation Layers (lower R-value)
FIG. 20B
2000-d
2015-b
2015-b
2002-d
2007-b
2002-d
2007-b
(a) Closed Insulation Layers (higher R-value)
(b) Partially Open Insulation Layers (lower R-value)
FIG. 20D 2300-b
2320-a
2330-a
2304-a
2302-a 2330
2302

2300-a
2304
2330
2302

DYNAMIC INSULATION SYSTEM FOR SWITCHABLE BUILDING ENVELOPE

CLAIM OF PRIORITY UNDER 35 U.S.C. § 119

The present application for patent claims priority to Provisional Application No. 62/879,655 entitled "DYNAMIC INSULATION SYSTEM FOR SWITCHABLE BUILDING ENVELOPE" filed Jul. 29, 2019, and assigned to the assignee hereof and hereby expressly incorporated by reference herein.

FIELD OF THE DISCLOSURE

The present disclosure relates generally to building insulation. In particular, but not by way of limitation, the present disclosure relates to systems, methods and apparatuses for dynamically varying an R-value of a structural component.

DESCRIPTION OF RELATED ART

In the United States (US), buildings are responsible for 40% of the total national energy consumption. For the US building sector, over 40% of the energy is used by heating, ventilation, and air conditioning (HVAC) equipment. Accordingly, there have been many efforts in recent years to develop and implement measures and technologies that reduce both the energy consumption and cost for heating and cooling buildings.

Due to a temperature difference between the indoors and outdoors, heat transfer through the building envelope may occur and affect both heating and cooling thermal loads that HVAC systems have to meet. Thermal insulation is often used to improve the heat transfer resistance (R-value) of the envelope in order to reduce heating and cooling needs for buildings. The traditional line of thinking is that a higher R-value insulation leads to lower energy consumption and energy costs for buildings. Therefore, much research has been conducted on high-performance insulation technologies such as vacuum insulated panels and gas insulated panels. However, some recent studies have challenged this convention by showing that increasing thermal resistance of a building envelope past a certain threshold may actually increase heating and cooling energy consumption.

Thus, there exists a need for a refined insulation system adapted to dynamically vary the R-value of a building's envelope, which may allow for the rate of heat transfer in or out of the building to be controlled and regulated in order to minimize thermal heating and cooling loads while maintaining indoor occupant comfort.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Broadly, the present disclosure relates to developing and using dynamic insulation systems (DISs) to allow for a structure's thermal resistance (or R-value) to vary with time. In some cases, the ability to vary the R-value of a component of a building allow for the rate of heat transfer in or out of the building to be controlled and regulated in order to minimize thermal heating and cooling loads while maintaining indoor occupant comfort. The performance and the effectiveness of dynamic insulation systems depend on several factors, including climatic conditions, indoor temperature settings, building occupancy patterns, and utility rate structures. For example, in mild climatic conditions, it may be advantageous for a building to have low thermal resistance in order to dissipate internal heat gains through the envelope, allowing the building to take advantage of free cooling rather than relying on mechanical cooling. Furthermore, the use of DISs with two R-values (e.g., high and low R-values), or with the ability to vary an R-value by increasing or decreasing it may assist in optimizing heating and cooling energy consumption for residential and/or commercial buildings. For the purposes of this disclosure, the terms DIS, fins, insulation blinds, insulation layers, switchable insulated shades, and insulation baffles may be used interchangeably throughout this application. Furthermore, the terms insulating fins smart glass, smart window, smart window film, and smart glazing layer and/or the terms furring, furring strips, mounting strips, and strapping may be used interchangeably throughout this application.

Some embodiments of the disclosure may be characterized as a structural insulation assembly having a variable insulating value and being incorporated into a thermal envelope of a structure, the assembly comprising: a first surface; a second surface; a cavity between the first and second surfaces and at least partially filled with a gas, such as air, argon, krypton, xenon, to name a few non-limiting examples. The structural insulation assembly may further comprise a plurality of insulating elongated fins fixed to distinct rotational axes, the rotational axes being parallel to each other, the plurality of elongated fins being continuously rotatable between a closed position, where the plurality of elongated fins are substantially vertical, and a fully open position, where the plurality of elongated fins are perpendicular to the first and second surfaces and parallel to each other; an actuator coupled to the plurality of insulating elongated fins and controlling a rotational angle of the insulating elongated fins to effectuate the variable insulating value; and a controller configured to pass instructions to the actuator dictating the angle of the insulating elongated fins.

Other embodiments of the disclosure may also be characterized as a method for controlling an angle of insulating fins of a structural insulation assembly having a variable insulation value and being incorporated into a thermal envelope of a structure, the method comprising: acquiring a setpoint for the structure's thermal control system; acquiring a first temperature outside a first side of the assembly; acquiring a second temperature outside a second side of the assembly; determining whether the thermal control system is in a heating or cooling mode; comparing the first temperature to the second temperature; comparing the first temperature to the setpoint; and adjusting an angle of insulating elongated fins of the assembly in response to the heating or cooling mode, and the temperature comparisons.

Some embodiments of the structural insulation assembly may further comprise one or more thermal sensors. In some embodiments, the one or more thermal sensors are in communication with the controller, wherein the controller bases the angle of the fins on temperature data provided by the one or more thermal sensors. In some embodiments, the one of the one or more thermal sensors is arranged in the cavity.

In some embodiments of the structural insulation assembly, the first surface is part of an exterior of the structure. In some embodiments, the second surface is part of an interior of the structure. In some embodiments, the structural insulation component is part of a wall, window, door, roof, ceiling, or floor. In some embodiments, the first or second surface is inside a wall cavity. In some embodiments, the structural insulation component is a modification or addition to the thermal envelope of the structure.

In some examples of the structural insulation assembly, the controller comprises processor-executable code encoded in a non-transitory tangible processor readable storage medium, the code, when executed by the controller, is configured to cause the controller to determine whether a thermal control system for the structure is in a heating or cooling mode, compare a temperature outside the first side and a temperature outside the second side to a temperature provided by the thermal sensor arranged in the cavity, compare a temperature outside the first side to a setpoint temperature of the HVAC system, and instruct the actuator to adjust the rotational angle of the insulating elongated fins in response to the heating or cooling mode, and the temperature comparisons. Other control systems are also envisioned, such as manually-set schedules.

In some examples of the method described above, the second side is inside the structure. In some examples of the method described above, the first side is exposed to an outside of the structure. In some examples of the method described above, the first side is part of the thermal envelope of the structure but is not exposed to an outside of the structure.

Some examples of the method described above may further include processes for acquiring a third temperature between the first side and the second side and comparing the first, second, and third temperatures, wherein the adjusting is based on the comparing the first, second, and third temperatures as well as the heating or cooling mode.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 7 illustrates an example plot of test results for heat fluxes on both sides of a fixed insulation in accordance with one or more implementations.

FIGS. 11A and 11B depict graphs for a number of hours for maintaining low R-values for the exterior walls in buildings with windows and internal loads in three U.S. locations: Golden, Colo.; Madison, Wis.; and Phoenix, Ariz., in accordance with one or more implementations.

FIG. 13 shows optimized R-value settings obtained for the continuously variable DIS applied to various walls according to an embodiment of the disclosure.

FIGS. 20A, 20B, 20C, and 20D illustrate example design configurations of DIS applications for interior shades in accordance with one or more implementations.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In some cases, thermal resistance envelopes in buildings may utilize dynamic insulation systems (DISs), for instance, to optimize energy consumption and energy costs. In some circumstances, buildings may deploy a 2-step DIS for controlling thermal resistance (R-value) and solar-heat gain of a wall, window, floor, ceiling roof, door, internal walls or structures, sub-structures within a wall, or any other element of the building's thermal envelope. In some other cases, buildings may utilize a continuously variable DIS for controlling an R-value and/or solar heat gain of its thermal envelope. In some cases, the thermal envelope of a structure or a building may also include entire structural sections, such as a whole wall or ceiling panel, or can include sub-components of a structure, such as a wall section or a panel that is affixed to an existing or new wall or other structure. The herein-disclosed continuously variable DIS may be constructed on site or using prefabricated panels that can be installed using the current construction practices for both new and existing buildings.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1B:
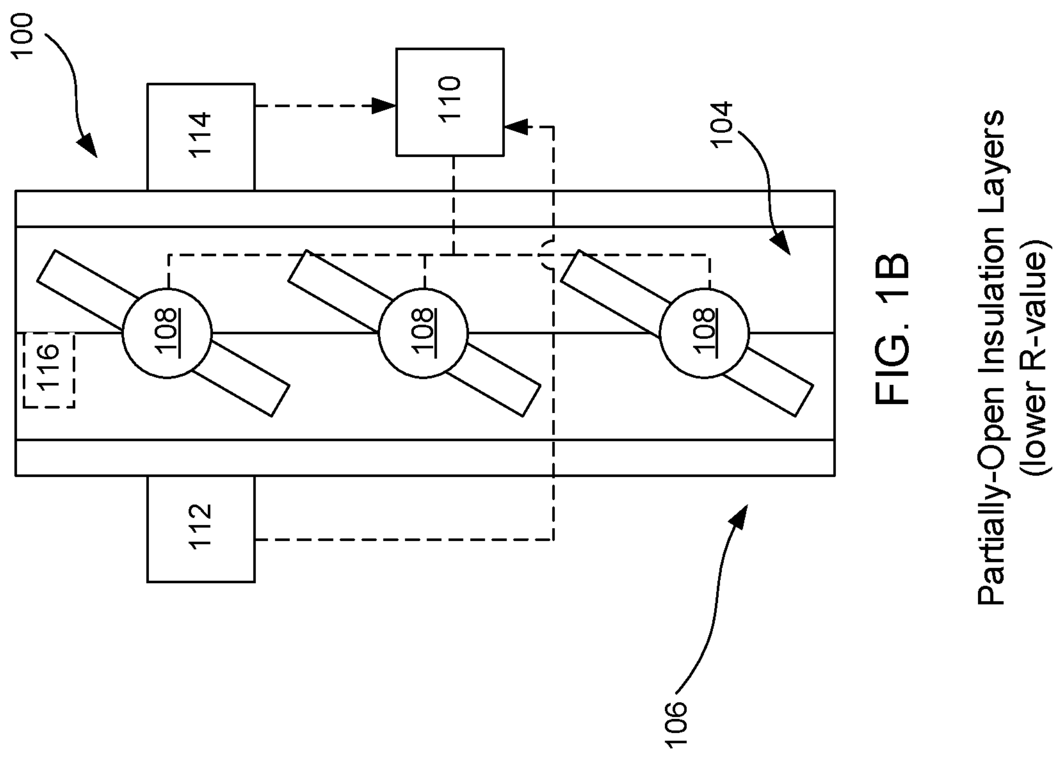
FIGS. 1A and 1B illustrate a continuously variable dynamic insulation system (DIS), according to an embodiment of the disclosure.
Figure 1A:
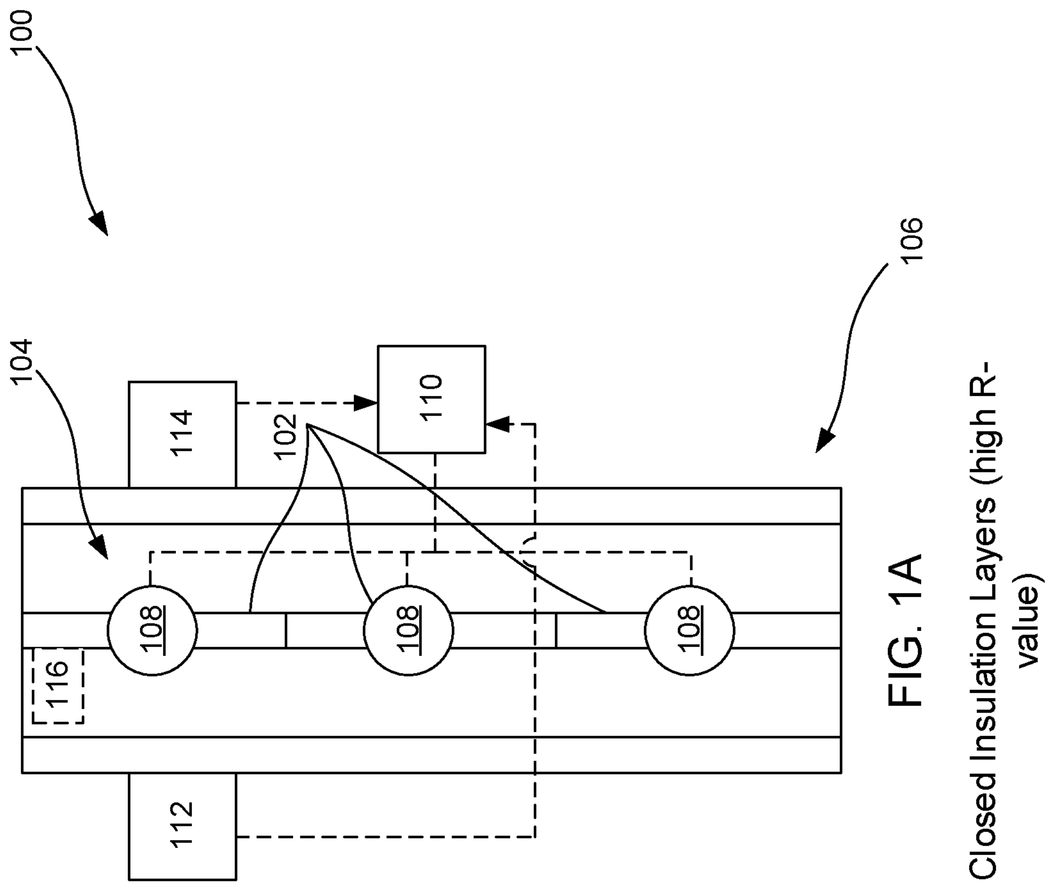

FIGS. 1A and 1B are directed to two states of a continuously variable DIS, according to an embodiment of the disclosure. As shown, FIG. 1A illustrates a continuously variable DIS 100 in a closed state where a maximum R-value of the continuously variable DIS 100 may be achieved. Further, FIG. 1B illustrates a partially open or partially closed state of the continuously variable DIS 100, where greater convection may be enabled, thereby enabling a lower R-value than the closed state seen in FIG. 1A.

In some cases, continuously variable DIS 100 may utilize rotating insulating fins 102, for instance, to adjust an amount of convection within a structural envelope element 106 (e.g., a wall, window, roof, floor, door, etc.), which may serve to vary an R-value of the structural envelope element. In some cases, the fins 102 may be synchronously rotated within a cavity 104 of the structural envelope element 106, and may be coupled to one or more actuators 108. Actuators 108 may be instructed by one or more controllers 110 to rotate the fins 102 to a desired angle corresponding to a known R-value for the system 100. In some embodiments, the one or more controllers 110 can include a processor and memory, the memory storing processor-readable instructions for rotating the fins 102 to specific angles at different times of the day, or in response to one or more thermal sensors 112, 114, 116 (e.g., on an outside and inside of a thermal envelope structure, as well as inside the air gap between interior and exterior surfaces of the thermal envelope structure).

In a typical operation, the actuator(s) 108 may be utilized to set the position of the fins 102 within the wall cavity 104, which may in turn be based on a set of control strategies to minimize the heating and cooling thermal loads for the structure. In some cases, the overall R-value of the structural envelope element may depend on the position angle of the fins 102. The continuous variation of the fins' 102 angle may depend on the design specifications of the continuously variable DIS 100, where the design specifications can be determined through empirical analysis of similar systems during prototyping.

As an example of operation, the fins 102 may remain in a closed state during daytime, and then gradually open as the sun sets, during which time external temperatures may drop below a desired internal temperature of the structure. Further, the fins 102 may be gradually closed again in the early morning, which may serve to prevent heat from flowing into the structure due to a lower ambient air temperature outside the structure during the night. In some cases, the fins 102 may be controlled based on feedback from one or more thermal sensors 112, 114, 116. For instance, the fins 102 may be opened when the external temperature is below a desired temperature within the structure (e.g., during spring, fall, and summer, but not during winter when heating is predominant). Additionally, once a target temperature is reached, the fins 102 may be closed. It should be noted that, the one or more thermal sensors 112, 114, 116 may continuously monitor temperatures and control the fins 102 based on the monitoring. In some embodiments, at least one thermal sensor 112, 114, 116 may be installed on the outside of the structure. Additionally, or alternatively, at least one thermal sensor may also be installed on the inside of the structure. In some embodiments, a third sensor may be arranged within the wall cavity or air gap. In some embodiments, the fins 102 may be rotated according to manual control or a schedule.

In an embodiment, the actuator(s) 108 or the fins 102 themselves, may be thermally-responsive components. In other words, the actuator(s) 108 or the fins 102 may display one or more mechanical changes in response to temperature fluctuations. For instance, as the external temperature lowers, the actuator(s) 108 may change shape causing the fins 102 to rotate toward an open position. Further, as external temperature rises, the actuator(s) 108 may change shape causing the fins 102 to rotate toward a closed position. In such cases, at least a portion of the actuator(s) 108 may be installed on an exterior of the structural envelope element, in order for the actuator(s) 108 to be exposed to the external temperature. In some examples, a rod, pulley, cable, belt, or any other applicable connector may be used to couple the actuator(s) 108 to the fins 102.

It should be noted that FIGS. 1A and 1B illustrate just one example of a continuously variable DIS, and various other configurations and topologies may be implemented in other embodiments. For instance, while FIGS. 1A and 1B depict interior and exterior thermal sensors, in other embodiments only one of these may be used, and in other embodiments no sensors may be in use (e.g., where a manual schedule is used). Further, while FIGS. 1A and 1B only shows three fins 102 and three corresponding actuators 108, more or less than three fins and/or actuators may be used in other embodiments. Additionally, while the actuators 108 are illustrated as being arranged at a pivot axis of the fins 102, in other embodiments, the actuators 108 could be arranged off a pivot axis. In some embodiments, fewer than N actuators 108 can be implemented, where N is a number of fins 102. While only a single controller 110 is shown, in other embodiments, more than one controller 110 can be used (e.g., one controller 110 for each actuator 108, or one controller 110 for every three actuators 108, to name two non-limiting examples). Additionally, while the fins 102 are shown within a cavity 104, in other embodiments, they could be arranged on an inside of the inner surface (e.g., inside the building rather than inside the cavity 104). In some embodiments, the fins 102 may overlap in the same plane, as further described in relation to FIG. 4, or overlap in two or more distinct planes (not shown), instead of butting end to end in the closed state as shown. In some embodiments, the fins may overlap and/or be at a slight angle in the closed state, rather than all of them being vertically oriented. In other embodiments, the edges of the fins may have alternative shapes such as a round or concave shape. Further, as shown, in some embodiments, all the fins 102 may be parallel to each other.

Figure 2:
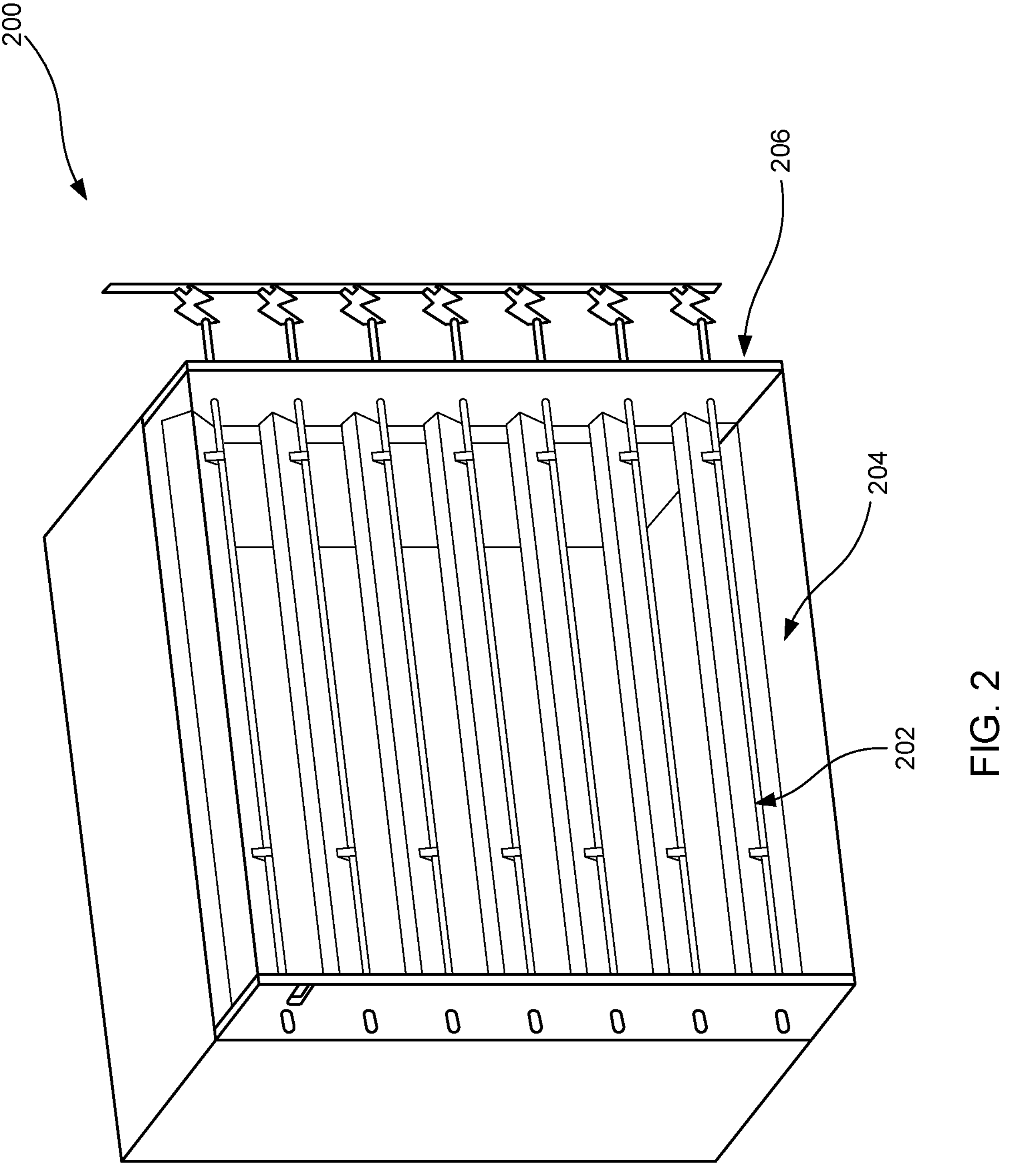
FIG. 2 illustrates an embodiment of the continuously variable DIS in accordance with one or more implementations.

FIG. 2 illustrates an example prototype of a continuously variable DIS 200 in accordance with one or more implementations. In some cases, the continuously variable DIS 200 may implement one or more aspects of DIS 100 described in FIGS. 1A and 1B, and other figures described herein. For instance, the DIS 200 may comprise one or more insulation layers or fins 202, a wall cavity 204, and a structural envelope element 206, which may be similar or substantially similar to the fins 102, wall cavity 104, and structural envelope element 106, respectively, described in FIGS. 1A and 1B. As illustrated, the fins 202 are in a partially open position, implying a lower R-value than when in a closed state.

Figure 3:
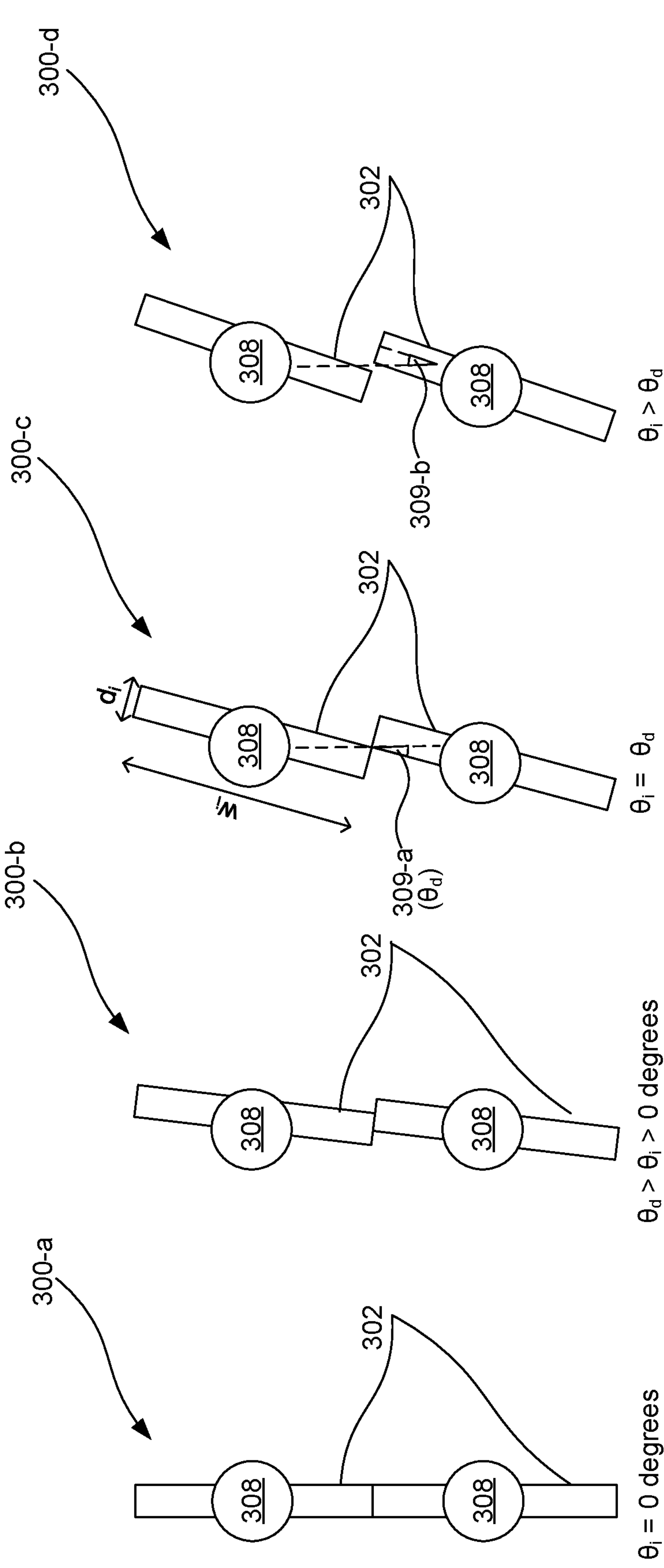
FIG. 3 illustrates a continuously variable DIS with different rotation angles of insulation layers

FIG. 3 illustrates the insulation layers within a DIS cavity according to an embodiment of the disclosure. In particular, FIG. 3 illustrates the impact of a DIS rotation angle on relative positions of insulation layers. In some cases, a DIS 300 (e.g., DIS 300-*a*, DIS 300-*b*, DIS 300-*c*, and DIS 300-*d*) may comprise one or more insulation layers, such as fins 302. The fins 302 may be similar or substantially similar to the fins 102 in FIGS. 1A and 1B, or fins 202 in FIG. 2.

In some examples, the fins 302 may be synchronously rotated within a cavity (e.g., cavity 104 in FIGS. 1A and B) of the structural envelope element (e.g., structural envelope element 106 in FIGS. 1A and B or a cavity coupled to the structural envelope), and may be coupled to one or more actuators 308. Actuators 308 may implement one or more aspects of the actuators 108 previously described in FIGS. 1A and 1B. Actuators 308 may be instructed by one or more controllers (shown as controllers 110 in FIGS. 1A and B) to rotate the fins 302 to a desired angle corresponding to a known R-value for the DIS. In some cases, the fins 302 or insulation layers may be set at any desired angle, $\theta_i$. When the angle is at $\theta_i=0$ degrees, as shown in DIS 300-*a*, the insulation layers or fins 302 may form a vertical wall and the R-value of the wall cavity may be at its highest value. As $\theta_i$ increases, shown in DIS 300-*b*, the R-value for the wall cavity may decrease. Further, a contact area between two adjacent insulation layers or fins 302 may decrease when the angle deviates from $\theta_i=0$ degrees (i.e., when insulation layers are no longer in a vertical position). In some cases, the reduced contact area may result in a lower overall thermal resistance for the DIS assembly. As the angle $\theta_i$ increases further, at a specific angle, any two adjacent insulation layers may cease to overlap. This specific angle is shown as angle 309-*a* in DIS 300-*c*, and may be referred to as a disconnect angle ($\theta_d$) for the DIS assembly. In some cases, two adjacent insulation layers or fins 302 may start to disconnect at the disconnect angle ($\theta_d$), upon which air may start to seep in through gaps between the insulation layers or fins 302. After this disconnection occurs, the R-value for a DIS wall may reduce significantly. In some cases, the disconnect angle ($\theta_d$) may depend on the geometric dimensions (i.e., the thickness ($d_i$) and width ($w_i$) of fin 302 shown in DIS 300-*c*) of the insulation layers. For instance, the disconnect angle ($\theta_d$) may be estimated by the inverse tangent of the insulation layer thickness over its width (i.e., arctan $$\left(\frac{d_i}{w_i}\right)).$$

As an example, when the insulation layer or fin 302 has a thickness of $d_i$=25 mm (2 inches) and a width of $w_i$=94 mm (3.7 inches), the disconnect angle may be estimated to be 15 degrees.

In some embodiments, and as shown in DIS 300-$d_i$, an angle 309-*b* of the insulation layers or fins 302 may be increased further, such that $\theta_i>\theta_d$. In such cases, the insulation layers may completely disconnect from each other, with no point of contact between adjacent insulation layers or fins.

Figure 4:
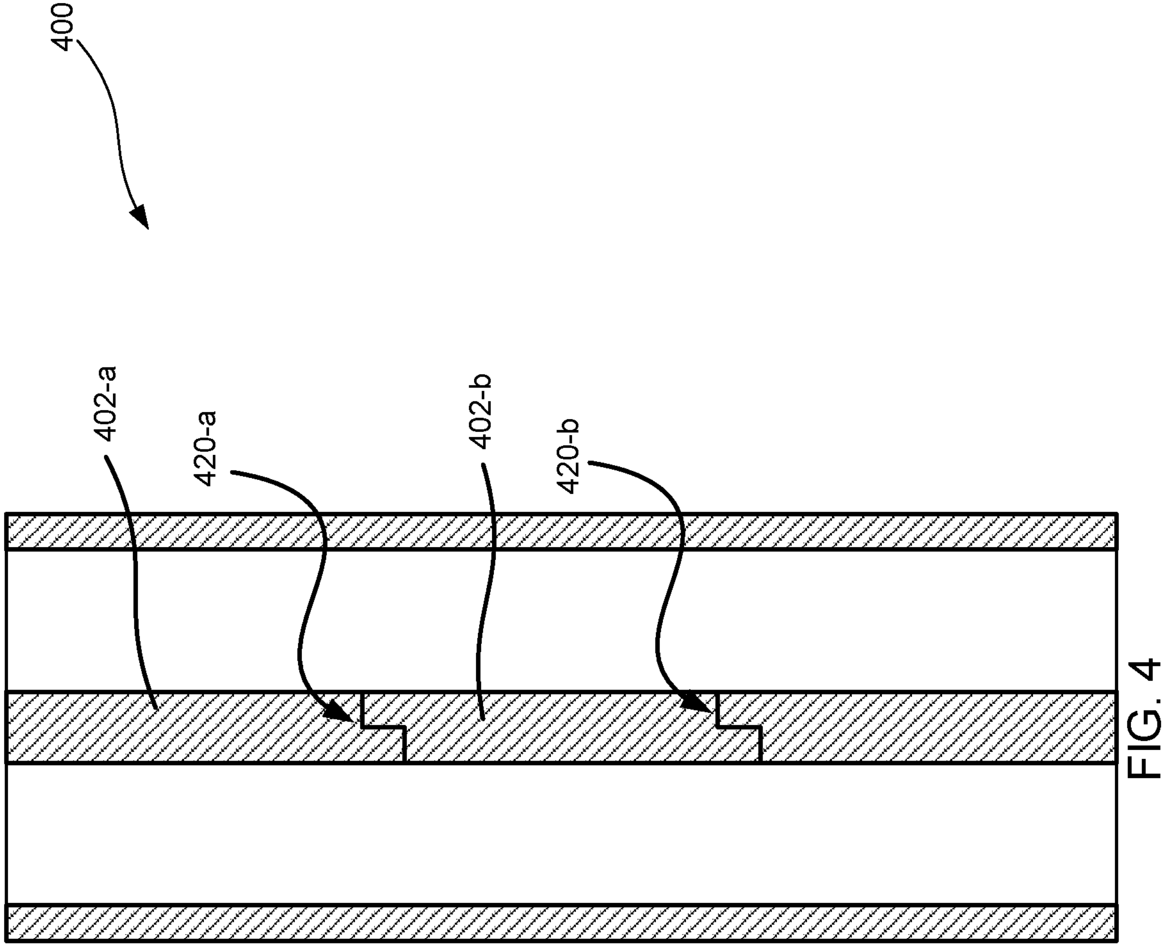
FIG. 4 illustrates an alternate embodiment of the DIS in accordance with one or more implementations.

FIG. 4 illustrates an embodiment of a DIS 400 in accordance with one or more implementations of the present disclosure. In some cases, DIS 400 may implement one or more aspects of the figures described herein. As seen, DIS 400 includes insulation layers or fins 402 (e.g., fin 402-*a*, fin 402-*b*) with notches 420 (e.g., notch 420-*a*, notch 420-*b*). In some circumstances, the notches 420 may serve to enhance the seal created between the edges of adjacent fins 402, such as fins 402-*a* and 402-*b*, when in the closed position. In some aspects, the notches 420 in fins 402 may assist in reducing convection as compared to the convection for fins 102 shown in FIG. 1A. It should be noted that, this is just one example of a structure that facilitates an enhanced seal between adjacent fins 402 in the closed position. Other fin structures may be used to achieve the same or a similar goal in different embodiments.

Testing Methodology

Figure 5:
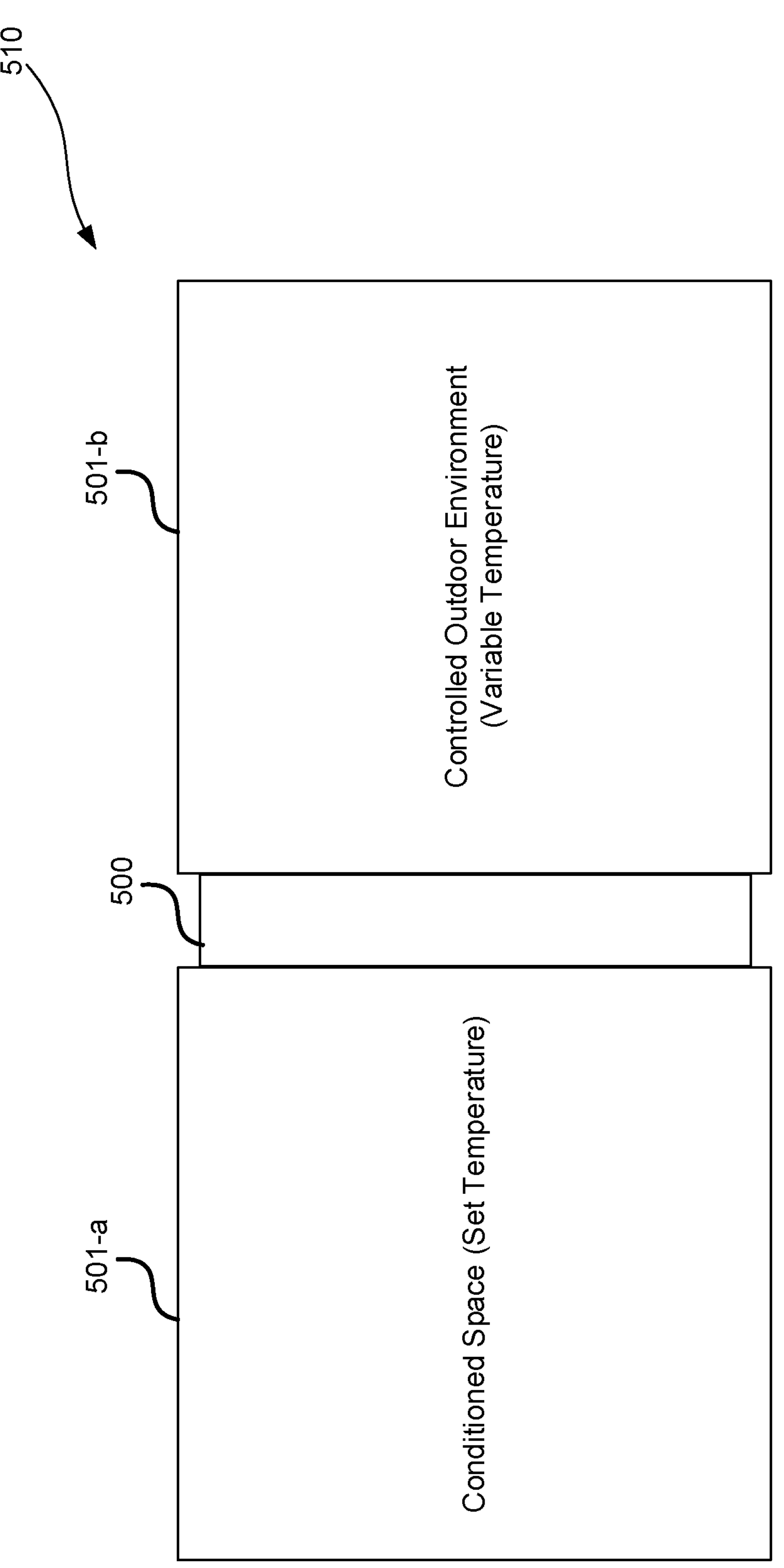
FIG. 5 depicts a test set up to measure an R-value for a DIS in accordance with one or more implementations.

Turning now to FIG. 5, which depicts a test set up to measure an R-value for a DIS 500 in accordance with one or more implementations. In some circumstances, the test setup may be used to test the effectiveness of continuously variable DIS 500. DIS 500 may implement one or more aspects of the figures described herein. In some cases, DIS 500 may be an example of a DIS prototype, previously discussed in FIG. 2.

In some cases, a test cell 510 of the test setup in FIG. 5 may comprise a conditioned space 501-*a*, a controlled outdoor environment 501-*b*, and the DIS 500 positioned between the conditioned space and controlled outdoor environment. Further, the testing protocol can meet ASTM C1363 and ISO 8990 standards for measuring the R-value of a non-homogenous building envelope. It should be noted that the conditioned space 501-*a* may be maintained at a set or constant temperature. Further, the temperature in the outdoor environment 501-*b* may be variable. In some cases, the test setup in FIG. 5 may be equipped with a set of sensors to measure heat fluxes and/or temperatures, further described below in FIG. 6.

In some cases, the testing procedure may first be validated using a well characterized single layer of static thermal insulation material. For instance, the testing approach may be used to determine the R-value for an opaque wall section composed of polyisocyanurate foam insulation with a known R-value. In one example, the manufacturer's rating R-value of the polyisocyanurate foam was 13.1 1 F·ft$^2$·hr/BTU (2.3 K·m$^2$/W).

Then, the procedure may be used to measure the R-value variation with the rotation angle for the DIS, where the DIS 500 is designed to be located within a cavity wall of the test cell 510 as shown in FIG. 5. In some examples, the experimental laboratory testing may be carried out under steady-state conditions, that is, when both temperatures and heat fluxes are constant and do not change with time.

Experimental Testing Setup

In some embodiments, a prototype may be built in order to test the performance of the DIS 500, as described below. In one example, the test cell 510 outlined in FIG. 5 may be constructed using particle-wood for the frame, as well as two acrylic plates as the interior and exterior sides, respectively. In this example, the test cell 510 has the following dimensions: a length of 47-in (1.19 m), a width of 35-in (0.89 m) for the entire test cell with a 13-in (0.33 m) wall section depth, and a height of 47-in (1.19 m). In some cases, the continuously variable DIS prototype (e.g., DIS 500) consisting of a removable wall section may be placed as one wall section of the test-cell. Further, the inside of the test cell 510 may be equipped with a heating device (e.g., a hair dryer or space heater) that may be controlled to raise and maintain the air temperature inside the test cell. The outdoor of the test cell 510, for instance, the controlled outdoor environment 501-*b*, may be maintained within a constant temperature range, for instance, from 68° F. to 70° F. (i.e., 20.5° C. to 21.7° C.) as demonstrated in FIG. 5. In one example, and as shown in FIG. 2, the prototype of the continuously variable DIS 500 may be made up of seven (7) polyisocyanurate foam fins that can be rotated at the same angle using an actuator, where each fin may be 40-in (1.02 m) long, 10-in (0.25 m) wide, and 2-in (0.05 m) thick.

Figure 6:
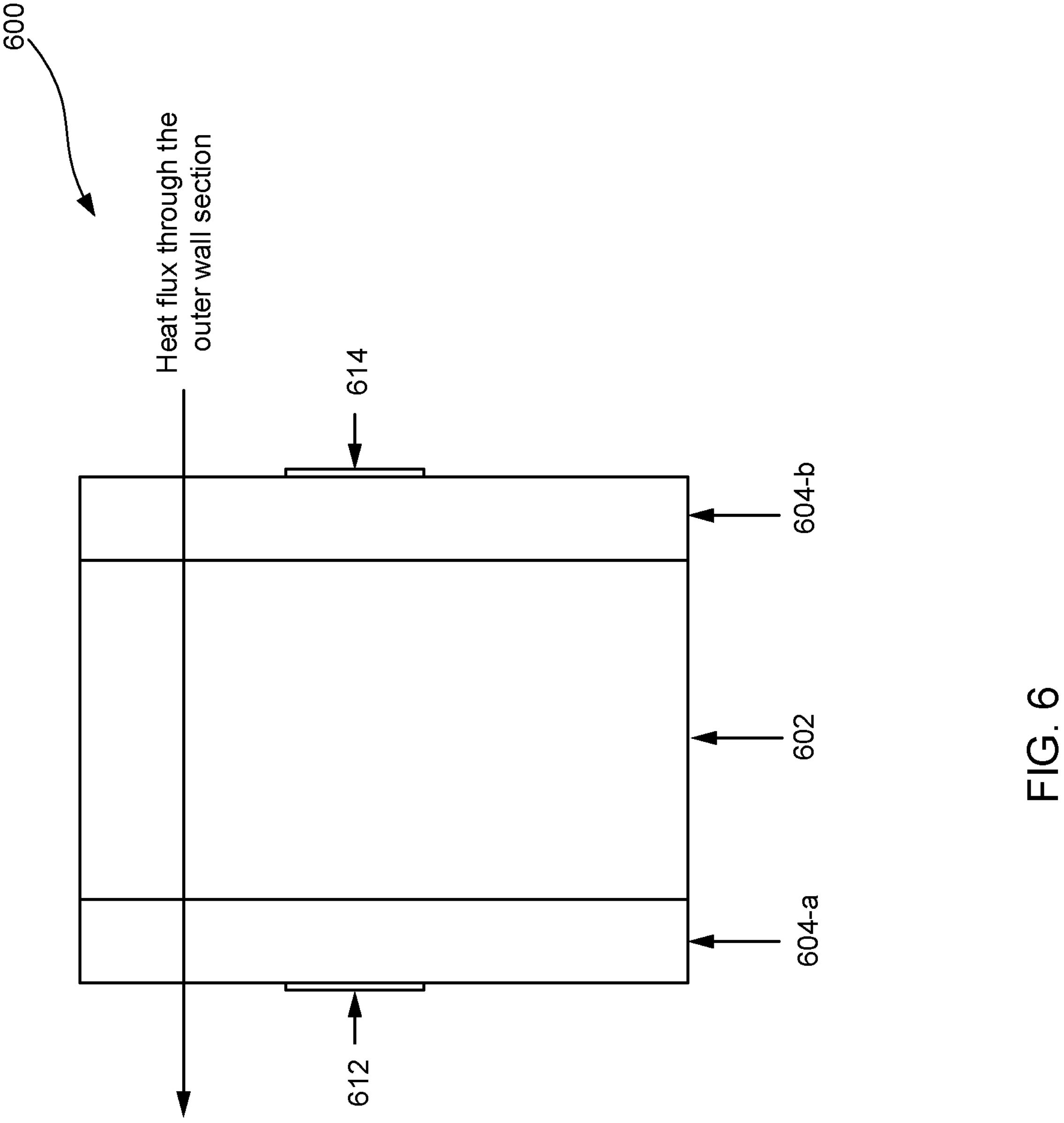
FIG. 6 illustrates an example configuration for placement of heat flux and temperature sensors for the DIS, according to an embodiment of the disclosure.

The temperatures and heat fluxes for the exterior surfaces of the continuously variable DIS prototype (i.e., movable section or DIS 500 of the test cell in FIG. 5) may be measured using a set of heat flux-temperature integrated sensors, as further described in relation to FIG. 6. In some embodiments, the heat flux sensors may utilize a differential-temperature thermopile designed to measure heat transfer per unit area (i.e., heat flux) through the surfaces comprising the sensors. In some cases, one or more modes of heat transfer, namely conduction, convection and/or radiation may be measured using the integrated sensors. In some cases, each sensor may include a thermocouple to measure temperature and/or a flat black coating with a known emissivity value (e.g., 0.94) to measure radiation heat transfer. In some cases, the output of the integrated sensor may comprise a DC voltage linearly proportional to the heat flux. Similarly, type-T thermocouples may be used for surface temperature measurements using a DC output voltage, where the DC output voltage may be proportional to the temperature difference between the sensor surface and the voltage measurement location.

FIG. 6 illustrates an example configuration for placement of heat flux and temperature sensors for a DIS 600, according to an embodiment of the disclosure. In this example, heat flux and temperature sensors 612 and 614 may be arranged on the inside and outside surfaces of the continuously variable DIS 600, respectively, where thermal insulation 602 is installed as one wall section of the test cell. In particular, interior heat flux and temperature sensors 612 are arranged on an inside of inner wall 604-*a*, whereas exterior heat flux and temperature sensors 614 are arranged on an outside of outer wall 604-*b*. Further, as shown, the thermal insulation 602 is positioned between the inner wall 604-*a* and the outer wall 604-*b*. In some cases, thermal insulation 602 may comprise one or more fins or insulation layers, similar to the fins 102 described in FIG. 1. FIG. 6 also depicts the direction of heat flux through the outer wall section. In the example in FIG. 6, the heat flux follows a path from the outer wall 604-*b* through the thermal insulation 602 and into the inner wall 604-*a*, which may be determined based on the measurements acquired by the heat flux and temperature sensors 612 and 614.

R-Value Measurement Approach

The R-value of any wall section may be measured using the temperature and heat flux integrated sensors 612 and 614 as illustrated in FIG. 6. In one example, during installation of the DIS 600, two sensors may be placed on each side of the wall (e.g., inner wall 604-*a* and outer wall 604-*b*) in order to measure heat flux and temperature of the inner and outer surfaces of the wall. The underlying equation for determining the R-value of a tested prototype is based on the Fourier's law, which assumes steady-state one-dimensional heat transfer as indicated in Eq. (1):

$$q'' = \frac{k}{t}(T_{2,outside} - T_{1,inside}) = \frac{(T_{2,outside} - T_{1,inside})}{R_{value}} \tag{1}$$

Where q" is the one-dimensional heat flux through the material, k is the thermal conductivity, and t is the thickness. The temperatures $T_{1,inside}$ and $T_{2,outside}$ refer to the temperatures measured by sensor 612 on the inside surface and by 614 on the outside surface, respectively, as depicted in FIG. 6.

Using Eq. (1), the thermal resistance or R-value of the prototype can be estimated as follows:

$$R-value = \frac{\Delta t}{q''} = \frac{(T_{2,outside} - T_{1,inside})}{q''} \tag{2}$$

Since there are two sides (i.e., inner wall 604-*a* and outer wall 604-*b*), two values of q" may be measured. In some cases, an average value of heat flux may be used to estimate the R-value, based in part on assuming steady-state conditions. In some cases, the duration of time required to reach steady-state conditions and ultimately perform the testing procedure may depend on one or more factors, such as the type of materials used for the tested specimen. For instance, the length of the period may depend on thermal and physical characteristics of the prototype including thickness, placement, density, and thermal properties of its various materials.

Error Propagation Analysis

In some cases, sensors 612 and/or 614 may have inherent measurement errors (e.g., related to their precision). In such cases, the resultant R-value obtained from testing may be estimated with some uncertainty levels. In some cases, the R-value measurement error can be estimated using an error propagation approach. In this approach, the standard deviation of a function y=y ($x_1$, $x_2$, . . . , $x_n$), whose independently measured variables ($x_1$, $x_2$, . . . , $x_n$) are uncorrelated and determined with the same confidence level, can be estimated using the first order expansion of the Taylor series:

$$S_y = \sqrt{\left(\sum_{i=1}^{n}\left(\frac{\partial y}{\partial x_i} s_{x,i}\right)^2\right)} \tag{3}$$

In Eq. (3), $S_y$ may denote a standard deviation function. Further, $S_{x,i}$ may denote the standard deviation of the measured quantity $x_i$. Based on Eq. (3), the propagated error for estimating the R-value defined by Eq. (2), can be estimated as follows:

$$S_y = \sqrt{\frac{1}{q^2}\left(S_{T1}^2 + S_{T2}^2\right) + \frac{\Delta T^2}{q^4} S_q^2} \quad (4)$$

Testing Verification Analysis

In order to verify the accuracy of the testing procedure outlined above, the procedure may be applied to measure the R-value of a known wall section specimen, for instance, a wall layer composed of only fixed polyisocyanurate foam insulation with a manufacturer's rating R-value of 13.1 F·ft$^2$·hr/BTU (2.3 m$^2$·° C./W), previously described in FIG. 5.

FIG. 7 summarizes testing results 700 for heat fluxes on both sides of a fixed insulation, such as fixed thermal insulation 602 in FIG. 6. In some cases, testing results 700 may be associated with the test setup for the DIS prototype seen in FIGS. 5 and/or 6. Further, Table 1 summarizes the average values for both temperatures and heat fluxes along the outer and inner surfaces of the foam layer as well as the results of the R-value estimation. In one example, the measured R-value for the foam layer was estimated to be 2.23 (m$^2$·K/W) or 13.4 (F·ft$^2$·hr/BTU), and it took about 100 minutes for the test to reach steady state conditions (i.e., when both measured heat fluxes $q_1$ and $q_2$ converged and remained stable). As seen, the measured R-value is close to the rated value for the foam insulation thermal resistance (i.e., without any surface heat transfer coefficients) given by the manufacturer of 13.1 F·ft$^2$·hr/BTU (2.3 m$^2$·° C./W). Further, there is good agreement with the experimental results (2.23 K·m$^2$/W) with less than 3% error. The R-value measurement uncertainty can be calculated to be 0.17 K·m$^2$/W (i.e., since the R-value of the wall section specimen is equal to 2.23±0.17 K·m$^2$/W), using the error propagation analysis provided by Eq. (4) and based on the rated sensor accuracy of 5% for both temperature and heat flux measurements.

TABLE 1

Summary of testing results for R-value estimation of the foam layer

| Parameters (unit) | Prototype values (measured and calculated) |
|---|---|
| $q_1$ (W/m$^2$) | 23.78 |
| $q_2$ (W/m$^2$) | 24.20 |
| $T_1$(° C.) | 77.65 |
| $T_2$(° C.) | 28.70 |
| Delta T = ($T_1 - T_2$)(° C.) | 53.54 |
| q-ave(W/m$^2$) | 23.99 |
| R-value(m$^2$ · K/W) | 2.23 |

Testing of Dynamic Insulation System for an Opaque Wall Prototype

Figure 8:
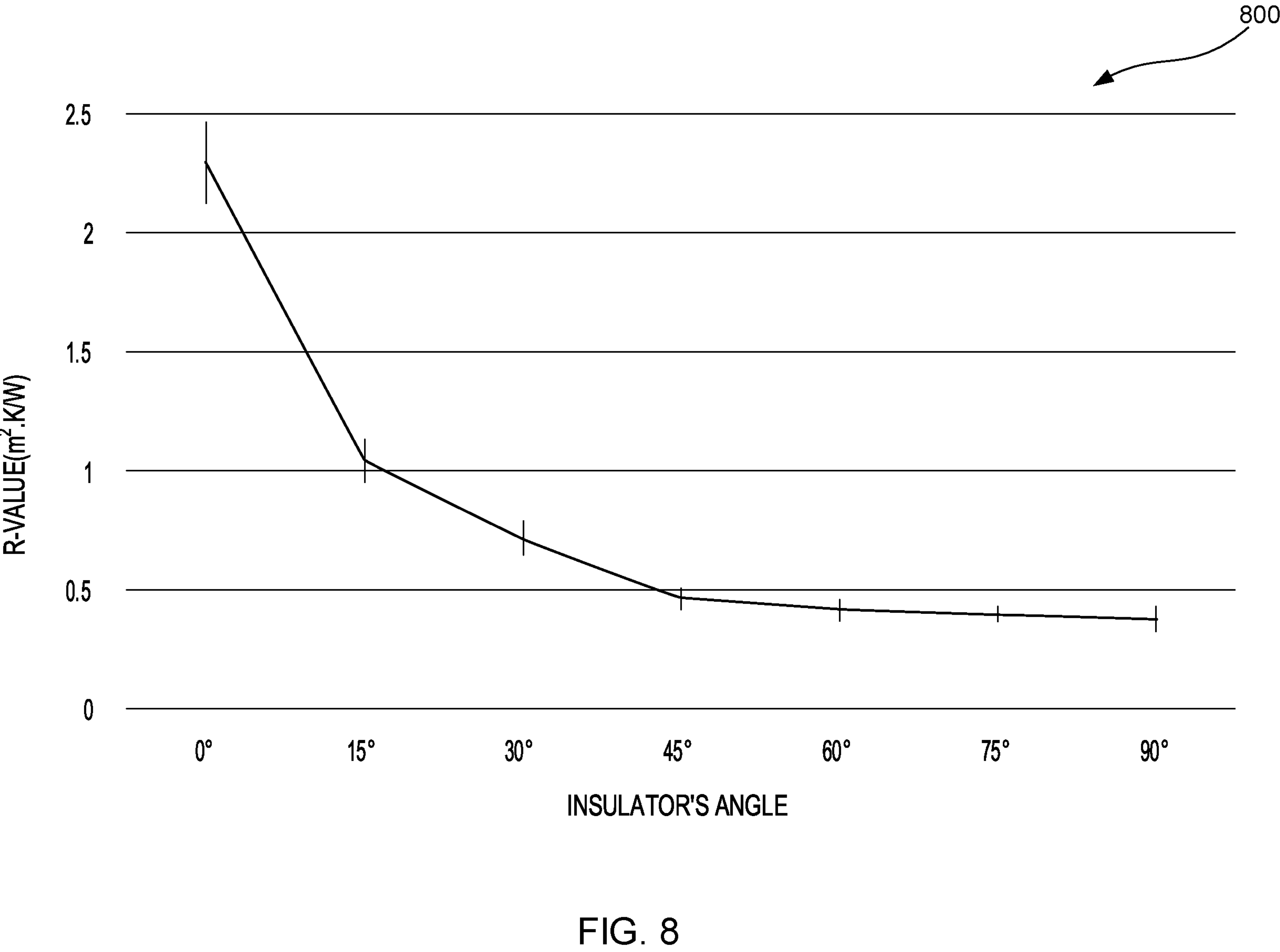
FIG. 8 illustrates an example plot of R-value measured as a function of insulator's angle in accordance with one or more implementations.

In some cases, the R-value for a continuously variable DIS prototype may be measured for different angle settings using the same procedure described in the previous section. Specifically, the R-value of the dynamic insulation system may be measured for different fin angles (e.g., when angles of the fins are set to vary between 0° (vertical position-fully closed) to 90° (horizontal position-fully open)). In some cases, a fin angle may also be referred to as an insulation angle. Table 2 and FIG. 8 present some example results of such a testing analysis, including the uncertainty levels.

TABLE 2

R-value measured as a function of the angle set for an opaque-wall DIS prototype

| Insulation Angle | R-value (m$^2$ · K/W) | Absolute Error (m$^2$ · K/W) |
|---|---|---|
| 0° | 2.30 | ±0.17 |
| 15° | 1.05 | ±0.09 |
| 30° | 0.72 | ±0.07 |
| 45° | 0.47 | ±0.05 |
| 60° | 0.42 | ±0.05 |
| 75° | 0.40 | ±0.05 |
| 90° | 0.38 | ±0.05 |

FIG. 8 illustrates a graph 800 of R-values measured as a function of the angle set for a tested opaque-wall continuously variable DIS. The results in graph 800 show that the measured R-values for the continuously variable DIS prototype may vary significantly with the angle. Specifically, the R-value may be reduced by 83.5%, a significant reduction, when angle for the fins are varied from 0° (vertical or closed position) to 90° (horizontal or fully open position). In some cases, this decrease in the thermal resistance or R-value of the opaque wall section may be associated with the increased convection heat transfer within the wall cavity when the disconnection between insulation layers or fins occurs from their vertical position. As indicated in graph 800, the initial opening of the fins from the 0° to 15° position may result in a substantial reduction of 54.3% for the R-value. However, the slope of R-value reduction (i.e., decrease rate) may be significantly lower, for instance, after the angle for insulation layers reach 45°. As shown, between 45° to 90° there is only a 19% drop in R-value.

Figure 17B:
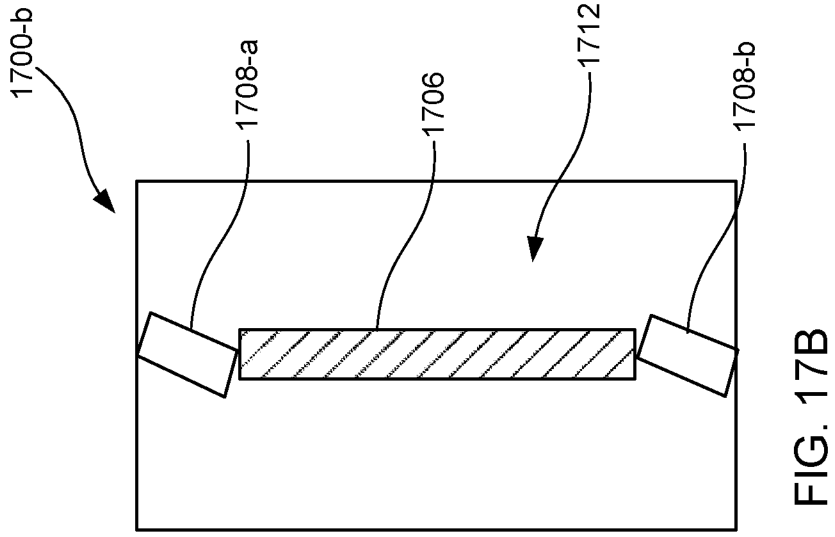
FIGS. 17A and 17B illustrate alternate embodiments of a continuously variable DIS in accordance with one or more implementations.
Figure 17A:
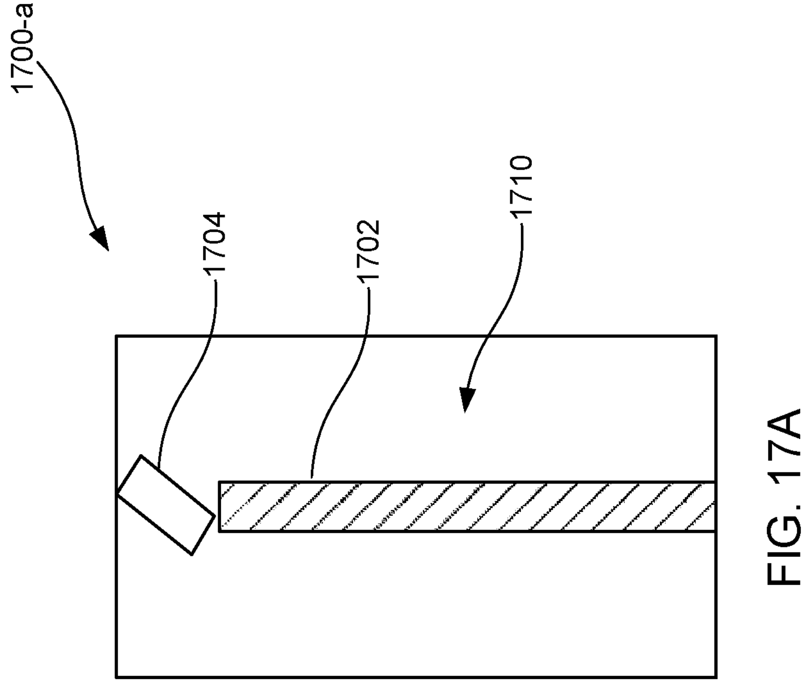

FIGS. 17A and 17B illustrate two alternative embodiments of continuously variable DISs 1700-*a* and 1700-*b*, respectively. Continuously variable DISs 1700-*a* and 1700-*b* may implement one or more aspects of the figures described herein. In the above sections, continuously variable DISs have generally been described with insulating fins being rotatable within a cavity (e.g., in FIG. 1, fins 102 may be synchronously rotated within a cavity 104 of the structural envelope element 106). However, in other embodiments, and as shown in FIGS. 17A-B, one or more portions of an interior insulation (i.e., interior insulation 1702, interior insulation 1706) may be fixed (i.e., non-rotatable) within a cavity 1710 or 1712. Cavities 1710 and/or 1712 may be similar to the cavity 104 in FIG. 1, and may be located within a structural envelope element of a building or affixed to a structural envelope element (e.g., as part of the floor of a non-insulated attic or as a panel attached to the inside of a window or door).

As seen in FIG. 17A, DIS 1700-*a* comprises one fixed portion of insulation 1702 and one rotatable fin 1704. Further, the DIS 1700-*b* in FIG. 17B shows one fixed portion of insulation 1706 and two rotatable fins 1708-*a* and 1708-*b*. Other configurations of fixed and rotatable insulation portions may be implemented, in different embodiments. It should be noted that the fixed portion of insulation and the rotatable fins may be composed of the same or different materials. In some cases, the rotatable fins (e.g., rotatable fin 1704, rotatable fins 1708-*a* and 1708-*b*) may be controlled via an actuator and motor, further described below.

Control Strategies

The herein-disclosed embodiments of a continuously variable DIS offer building operators several options to control the R-value of a building envelope, as well as control the R-value of different walls (e.g., East versus West) or different components of the envelope (e.g., windows versus doors and walls). Aspects of the present disclosure may assist in mitigating energy use and cost while maintaining internal comfort as compared to constant-R-value building envelopes. Some simplified and optimal control strategies were tested and evaluated for the herein-disclosed embodiments of a continuously variable DIS applied to opaque walls (and other structural envelope components) for residential and commercial buildings. These control strategies and their impact on energy performance of buildings are summarized in the following two sections.

Two-Step Controls

Figures 9A, 9B:
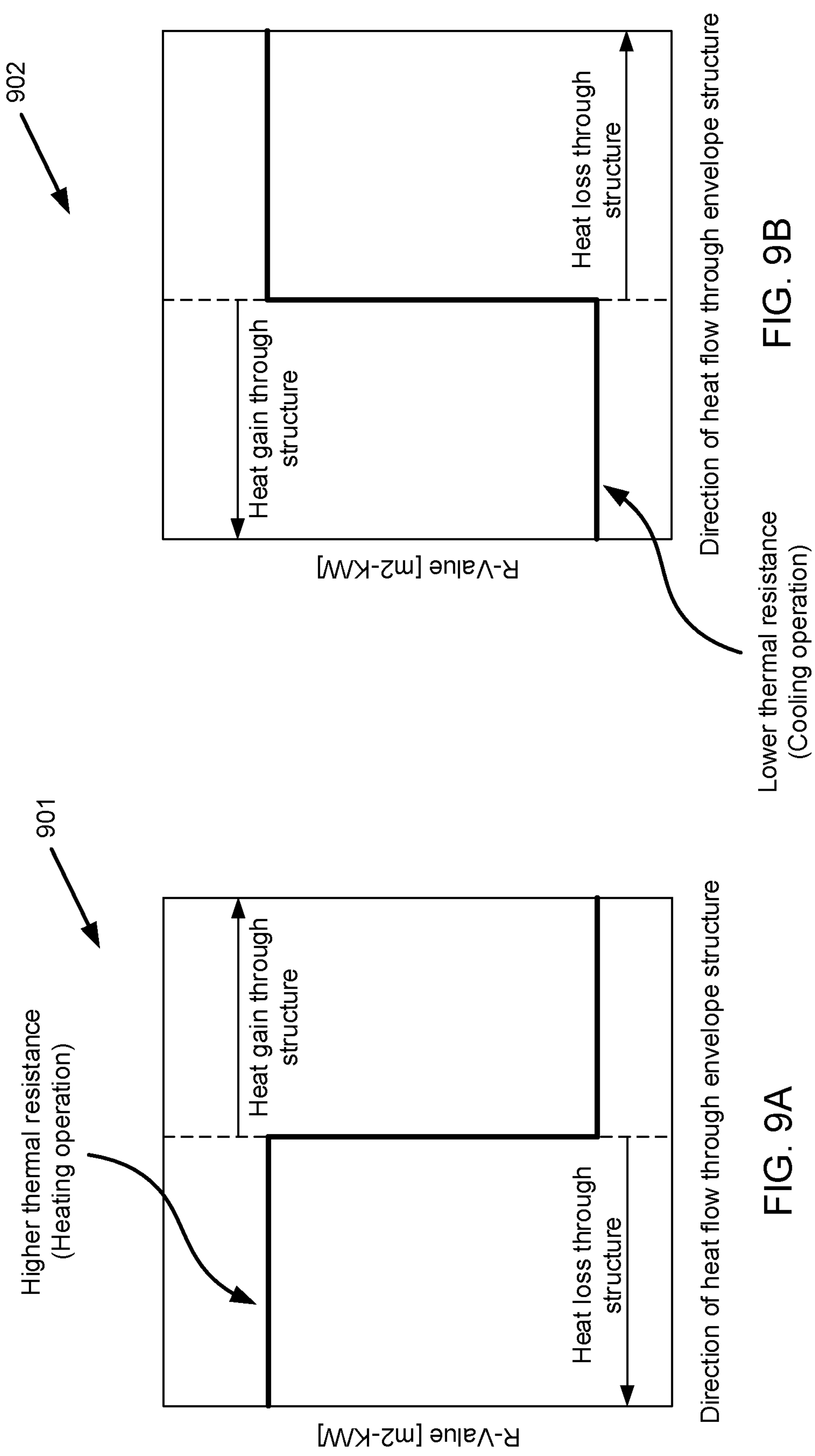
FIGS. 9A and 9B illustrate examples of control strategies for varying the thermal resistance for a DIS layer according to an embodiment of the disclosure.

In some cases, a control parameter may include the direction of heat flow through an exterior wall. In some cases, heat flow direction may be determined by monitoring the inside, middle, and outside surface temperatures of the exterior wall. FIGS. 9A and 9B depict example control strategies 901 and 902, respectively, for varying the thermal resistance of a two-step R-value material and ultimately the exterior wall (e.g., using high and low R-value settings for the DIS). In some embodiments, a controller may first determine the direction of heat flow through the building envelope. Then, the controller may examine temperature distribution inside the exterior wall to determine the appropriate RSI-value (R-value in SI unit) of the two-step R-value material in the middle layer of the exterior wall. For example, as seen in FIG. 9A, when an outside surface temperature is lower than the inside surface temperature in heating season, the controller may place the two-step R-value material in an increased thermal resistance state in order to reduce heat loss through the exterior walls. Further, as seen in FIG. 9B, when an outside surface temperature is higher than the inside surface temperature during the cooling season, the controller may place the two-step R-value material in a decreased thermal resistance state to release heat from indoors to the outdoors through the exterior wall.

Figure 10B:
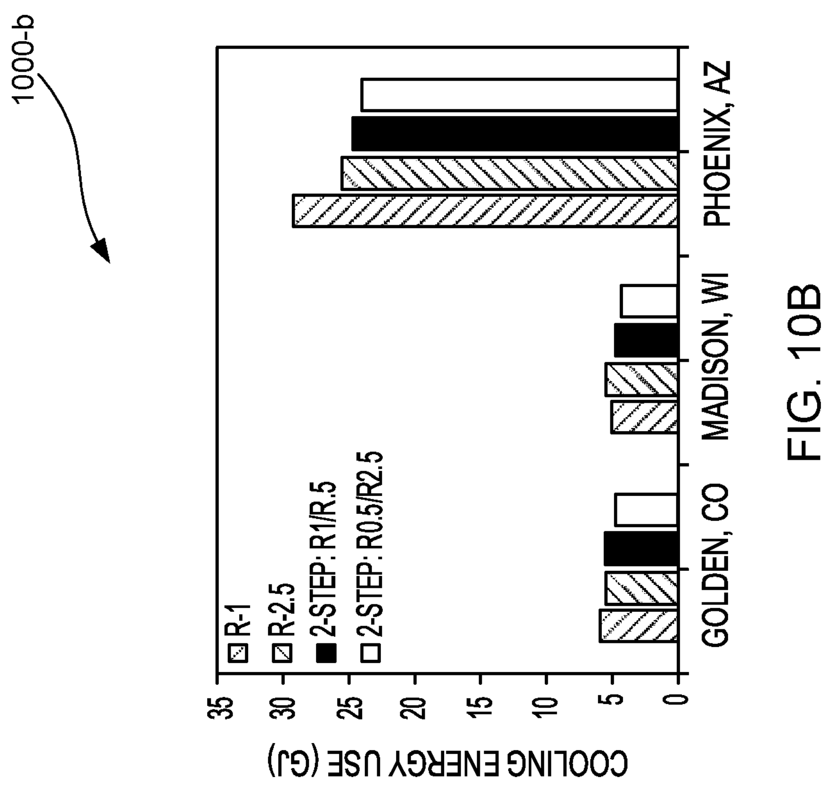
FIGS. 10A and 10B summarize reported analysis results of deploying a two-step R-value material in accordance with one or more implementations.
Figure 10A:
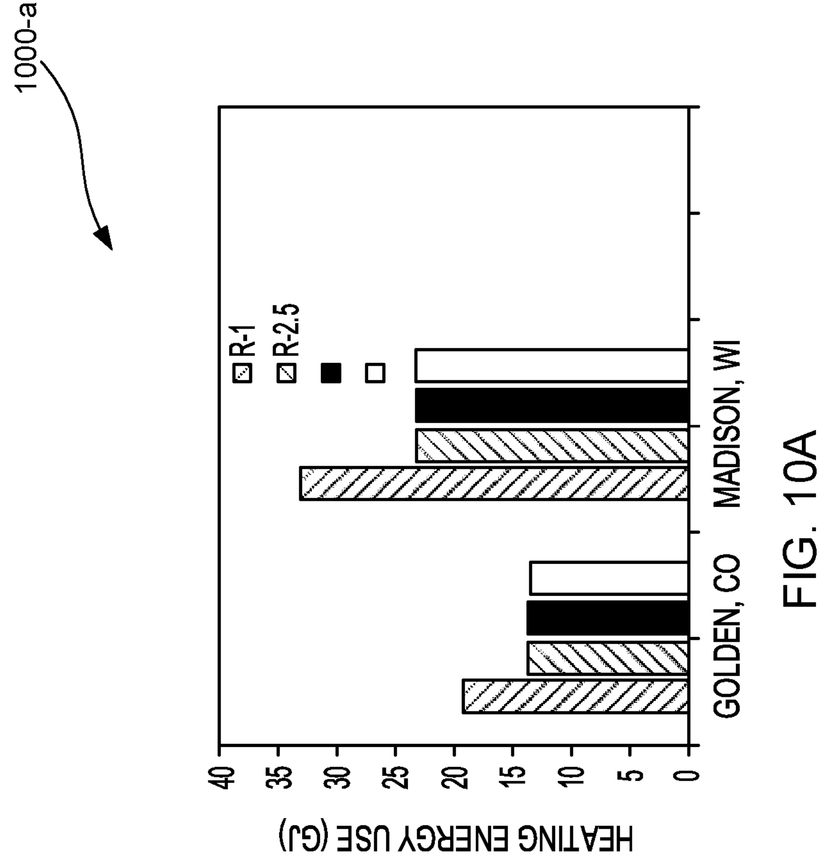

FIGS. 10A and 10B summarize reported analysis results 1000-*a* and 1000-*b* following deploying a two-step R-value material (instead of static insulation walls) at three different locations in the United States, with substantially different climate types. Table 3 notes that a 2-step-RSI-1/RSI-2.5 R-value material switched between an increased and decreased thermal resistance state may reduce cooling energy use by up to 8% as compared to a static RSI-2.5 wall option in Golden, Colo. (semi-arid climate). Furthermore, the 2-step-RSI-0.5/RSI-2.5 control strategy may reduce cooling energy use by up to 15% as compared to the RSI-2.5 wall option in Golden, Colo. Moreover, as seen in Table 3, cooling energy use may be decreased in Madison, Wis. (warm summer continental climate) by 11% and 21%, respectively, by switching a 2-step-RSI-1/RSI-2.5 and 2-step-RSI-0.5/RSI-2.5 R-value material between an increased and decreased thermal resistance state. However, the 2-step R-value material switched between an increased and decreased thermal resistance state may achieve only 6% cooling energy savings with little impact on heating energy use in Phoenix, Ariz. (hot desert climate).

TABLE 3

Heating and cooling energy use savings from 2-step DIS compared to static RSI-1.0 exterior walls in three US locations: Golden, CO; Madison, WI; and Phoenix, AZ

| | Heating energy use savings (GJ) | | | % savings | | |
|---|---|---|---|---|---|---|
| | R-2.5 | 2-Step RSI-1/ RS1-2.5 | 2-Step RSI-0.5/ RSI-2.5 | R-2.5 | 2-Step RSI-1/ RS1-2.5 | 2-Step RSI-0.5/ RSI-2.5 |
| Golden, CO | −5.55 | −5.65 | −5.77 | −29.0 | −29.5 | −30.1 |
| Madison, WI | −10.14 | −10.14 | −10.15 | −30.6 | −30.6 | −30.6 |
| Phoenix, AZ | n/a | n/a | n/a | n/a | n/a | n/a |
| | **Cooling energy use savings (GJ)** | | | **% savings** | | |
| | R-2.5 | 2-Step RSI-1/ RSI-2.5 | 2-Step RSI-0.5/ RSI-2.5 | R-2.5 | 2-Step RSI-1/ RSI-2.5 | 2-Step RSI-0.5/ RSI-2.5 |
| Golden, CO | −0.24 | −0.67 | −1.05 | −4.3 | −11.8 | −18.6 |
| Madison, WI | 0.40 | −0.18 | −0.69 | 8.5 | −3.7 | −14.5 |
| Phoenix, AZ | −3.86 | −4.70 | −5.34 | −13.2 | −16.0 | −18.2 |

FIGS. 11A and 11B illustrate bar charts 1100-*a* and 1100-*b*, respectively. In some cases, the number of hours per season when a 2-step DIS exterior wall may be set to a lower thermal resistance value may vary depending on a variety of factors, including the orientation or direction of the wall (e.g., West wall, South wall, East wall, North wall), as well as the climate at the location. Bar charts 1100-*a* and 1100-*b* present a comparison of the same for three U.S. locations with different climates: Golden, Colo.; Madison, Wis.; and Phoenix, Ariz. In some cases, the number of hours per season (e.g., October-March and April-September) that an exterior wall may be maintained at a low-R value may also depend on the internal load of the building comprising the exterior wall, as well as window parameters (i.e., number of windows, size of windows, ratio of window to wall surface area, etc.) for the exterior wall. In this example, it was assumed that the exterior walls had windows, where the windows were of a constant size and ratio with respect to the wall. Further, a constant internal load was factored in for the calculations. As seen in FIG. 11, the results indicate that when high internal loads are considered, a north wall equipped with a 2-step DIS wall may be the most actively controlled.

Figure 12:
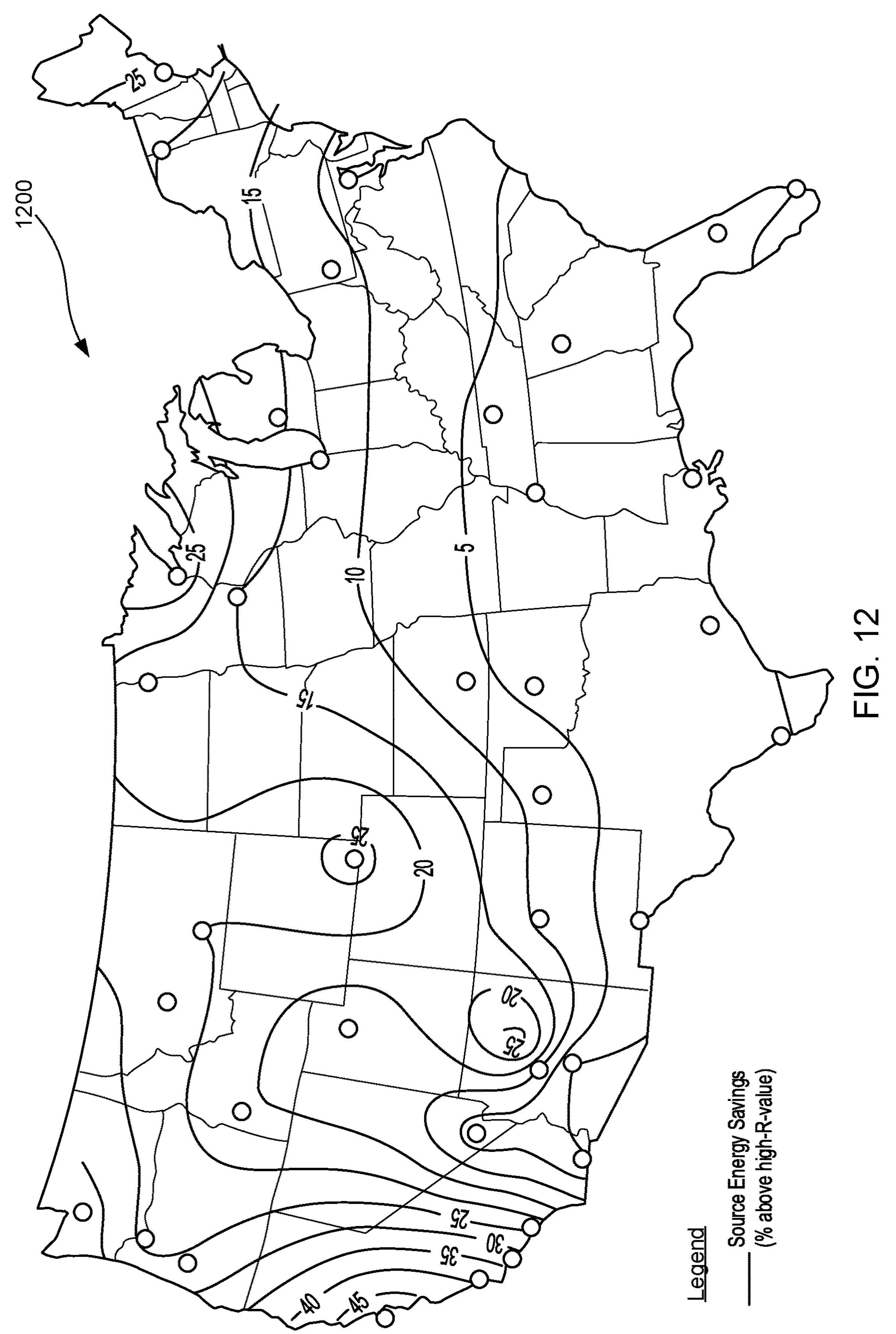
FIG. 12 shows a U.S. map with contour lines indicating a percentage energy efficiency potential for different climates in accordance with one or more implementations.

FIG. 12 shows a U.S. map 1200 with contour lines indicating a percentage energy efficiency potential (e.g., 5%, 10%, 15%, 20%, 25%, 30%, etc.) for different climates when a 2-step DIS is implemented over a fixed insulation residential construction. On average, percentage energy efficiency potentials are higher (e.g., 30-45%) in locations with mild climate types, such as Northern California, Oregon, and Washington. Further, locations with distinct seasons and having wide variations in summer and winter temperatures, such as the Midwest, Great Plains, and Northeastern United States, have the next highest percentage energy efficiency potentials (e.g., 15-25%). Lastly, warmer locations in the South, such as Texas, Florida, Arizona, etc., show percentage energy efficiency potentials in the range of 5-15%, which could be attributed to a lower diurnal temperature swing during the summer months.

Continuously Variable Controls

In some embodiments, optimal control techniques may be deployed for continuously variable DIS structural envelope components. In some cases, the control techniques used may depend on the desired objective function (e.g., minimizing electrical peak demand, maximizing thermal comfort, and shifting demand, to name just a few non-limiting examples). In some cases, optimal controls may be implemented through model predictive control (MPC) techniques or machine learning schemes. MPC may refer to an advanced method of process control that may be used to control a process while satisfying a set of constraints. In some cases, MPC may be used to optimize a finite time-horizon. In some regards, MPC may differ from Linear-Quadratic Regulation (LQR), since MPC implements a current timeslot and then optimizes again. In some examples, the following objective function and constraints for optimization analysis can be used to minimize energy cost specific heating and cooling:

$$f = \min\left(\sum_{0}^{24\ hrs} E_{cooling} * \text{rate}_{cooling} + E_{heating} * \text{rate}_{heating}\right) \quad (5)$$

$$\text{for}: kl \leq k \leq ku$$

Figure 19:
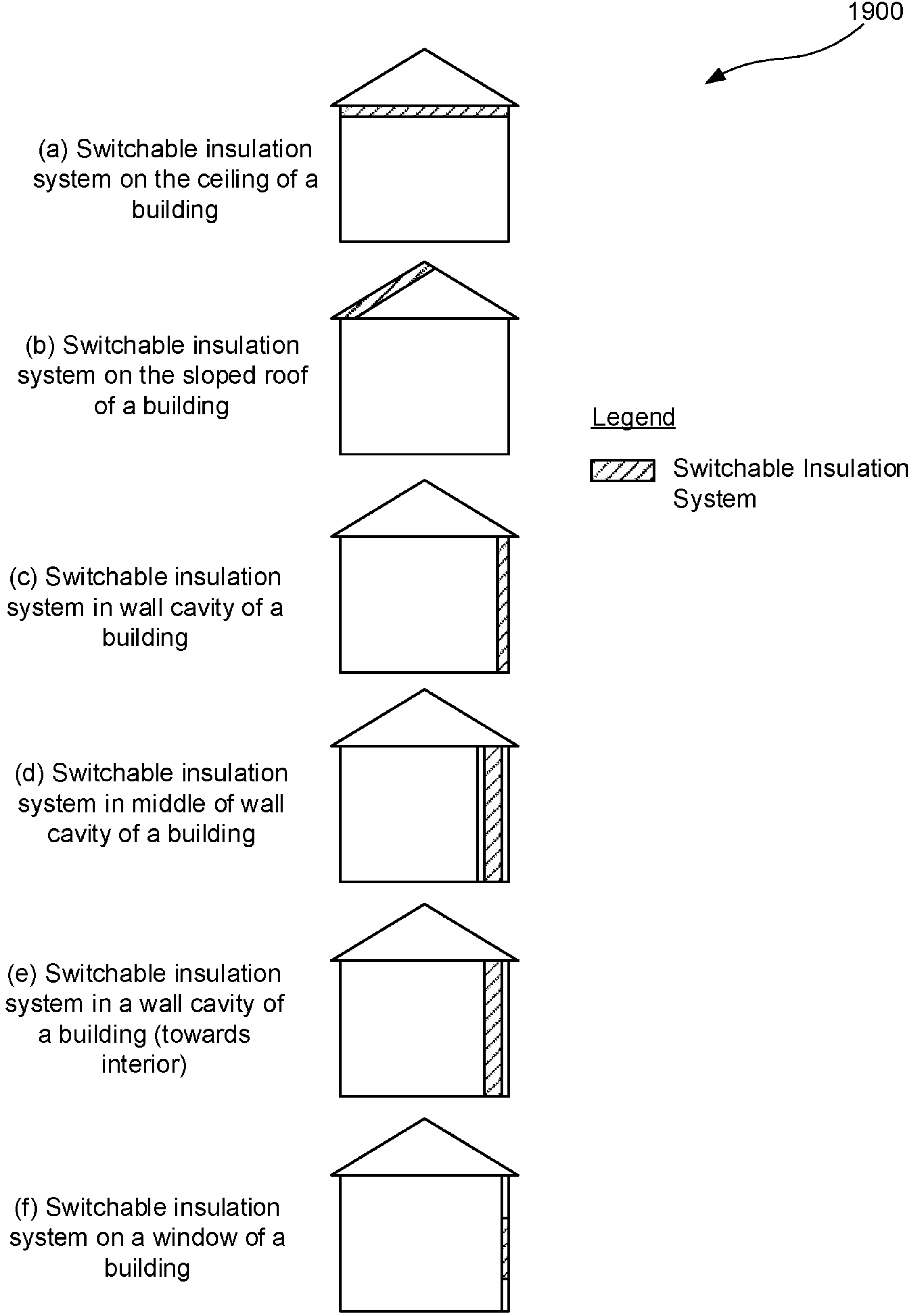
FIG. 19 illustrates example applications or configurations for a DIS in accordance with one or more implementations.

Where, k—thermal conductivity values to be set for the continuously variable DIS for all the building walls kl, ku—lower bound and upper bounds of thermal conductivity values rate cooling, heating—utility rates for electricity and natural gas, respectively $E_{cooling}$—Energy use associated with the cooling system $E_{heating}$—Energy use associated with the heating system In some cases, the optimization objective function of Eq. (5) may be set to optimize the total building heating and cooling energy cost for any given day by varying the thermal conductivity value (and thus R-value) settings of the continuously variable DIS. In some examples, the thermal conductivity and/or R-value may be varied for each building wall together or separately. In one non-limiting example, the upper and lower bounds of the thermal conductivity values for each wall may be set to be 2.0 W/m·K and 0.032 W/m·K, respectively. For a fixed thickness, for instance, of 0.075 m (3-in) insulation, the upper and lower bounds of thermal conductivity may correspond to the continuously variable DIS layer having a low resistance (e.g., 0.04 $m^2K/W$) and a high resistance (e.g., 2.37 $m^2K/W$). Further, in some cases, the Genetic Algorithm (GA)-based optimizer may be used to evaluate one or more potential continuously variable DIS layer R-values between 0.04 $m^2K/W$ and 2.37 $m^2K/W$. In this way, the GA-based optimizer may be used to identify optimal hourly continuously variable DIS settings for a 24-hour period for the one or more building walls. In some aspects, the optimal selection may result in lower combined heating and/or cooling energy costs. For simplicity, energy and energy demand penalties have been excluded from the above discussion. It should be noted that, the GA-optimization framework may be configured to handle energy and demand charges, as well as additional constraints (such as desired thermal comfort levels), in other embodiments. In some examples, similar optimization principles may be applied to a DIS deployed for interior shading devices (i.e., roofs, attics, or windows), as illustrated in FIGS. 19 and 20.

Figure 15:
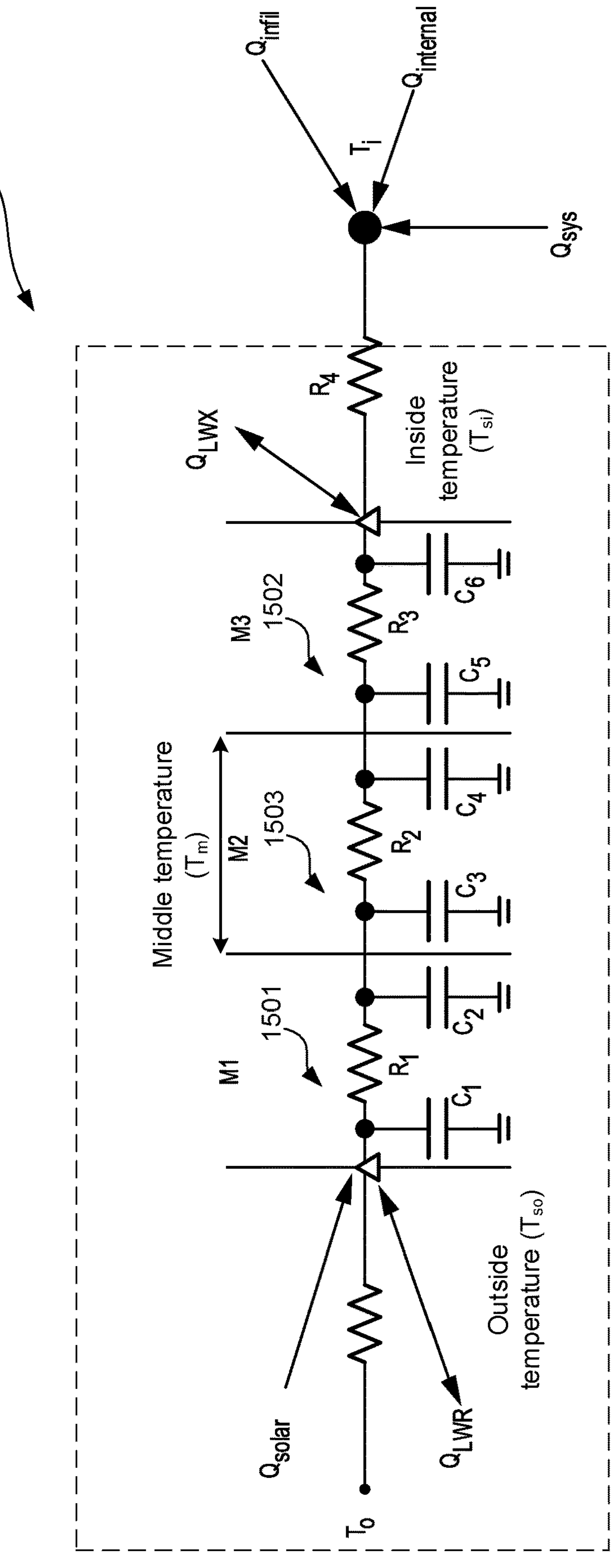
FIG. 15 illustrates an example resistor-capacitor (RC) thermal network model of a multi-layer exterior wall or a thermal envelope structure according to an embodiment of the disclosure.

FIG. 15 illustrates a Resistance-Capacitive (RC) thermal network model 1500 that can be used to operate a DIS using optimal controls. In some cases, a multi-layer exterior wall (or any thermal envelope structure), as described throughout this disclosure, may be modeled using a RC thermal network. In some cases, FIG. 15 may implement one or more aspects of the figures described herein. In some cases, a multi-layer exterior wall or another thermal envelop structure may comprise an exterior wall 1501 (M1), and an interior wall 1502 (M3). The multi-exterior wall may connect the interior of a building to the outdoor environment via a DIS located in the middle layer of the wall, represented by DIS 1503 (M2). In some aspects, the RC thermal network model 1500 for a multi-layer external wall connecting the interior to the exterior of a building may be used to evaluate the thermal performance of the DIS located in the middle layer of the wall.

In some examples, exterior wall 1501 (M1) and interior wall 1502 (M3) may each be modeled using a RC circuit comprising at least one resistor and two capacitors. In the example shown, three resistances and two capacitances arranged in a pi-configuration have been used to model each section of the multi-layer wall. In some cases, different resistance and capacitance values may be used to model M1, M2, and M3. Further, the capacitors and resistors used to model M1, M2, and M3 may be the same (i.e., C1=C2=C3=C4=C5=C6; R1=R2=R3) or different (i.e., R1≠R2≠R3; C1≠C2≠C3≠C4, and so on). In some embodiments, exterior and interior wall surface temperatures, $T_{so}$ and $T_{si}$, may be measured using one or more sensors, previously described in relation to at least FIGS. 5 and 6. In other cases, exterior and interior surface temperatures may be determined using heat balance equations and/or measured indoor and outdoor atmospheric temperatures.

In some cases, the dynamic insulation material or DIS 1503 (M2) may comprise one or more rotating insulating fins described throughout this disclosure. In some cases, thermal resistance of the dynamic insulation material 1503 (M2) may be controlled, for instance, based on a heating or cooling requirement for an interior of the structure (i.e., the region to the right of M3). Further, the direction of heat flow through the continuously variable DIS may be utilized as a control parameter for controlling the thermal resistance of the DIS 1503 (M2). In some circumstances, the heat flow direction may be determined by monitoring the outside, middle, and inside surface temperatures (e.g., $T_{so}$, Additionally or alternatively, one or more heat flux parameters (e.g., exterior solar radiation incident ($Q_{solar}$), net longwave radiation ($Q_{LWR}$), heat transfer to/from the HVAC system ($Q_{sys}$), sensible load caused by infiltration ($Q_{infil}$), convective parts of the internal loads ($Q_{internal}$), etc.) may be determined and used to model the RC thermal network 1500. Thus, the RC thermal network model 1500 presented in FIG. 15 may account for various heat mechanisms, including heat transfer through the building envelope, as well as internal heat gains or losses from solar radiation, equipment, lighting, people, and air infiltration.

Referring back to FIGS. 9A and 9B, which show a heating operation mode and cooling operation mode, respectively. In some embodiments, a controller (not shown) may use one or more of the inside wall surface temperature, $T_{si}$, the outside wall surface temperature, $T_{so}$, and the middle temperature, $T_m$, to assess heat flow direction. Based on this assessment, the controller may assess temperature distribution throughout the interior, middle, and/or exterior wall, to determine an appropriate R-value for the continuously variable DIS. For example, when the outside surface temperature, $T_{so}$, is higher than the inside surface temperature, $T_{si}$, during the cooling season, the thermal resistance of the DIS (or M2 in FIG. 15) may be increased to minimize the heat gains through the continuously variable DIS. Contrastingly, when the outside surface temperature, $T_{so}$, is lower than the inside surface temperature, $T_{si}$, during the heating season, the thermal resistance of the DIS (or M2 in FIG. 15) may be decreased to minimize the amount of heat escaping from the indoors to the outdoors.

It should be noted that, adjusting the R-value as soon as the outside temperature, $T_{so}$, begins to rise, for instance, during cooling season, may actually lead to an increased thermal load on the structure (i.e., unnecessary expenditure of cooling energy). Aspects of the present disclosure are also directed to the control of R-values via heat flux, since heat flux may allow for a more effective control of R-value than a mere comparison of the outside surface temperature ($T_{so}$) with respect to the inside surface temperature ($T_{si}$). For instance, when the middle temperature ($T_m$) in FIG. 15 is lower than the inside surface temperature ($T_{si}$), heat may be lost from the indoors to the outdoors. To account for solar radiation and thermal mass effects, a control algorithm may be utilized to control the continuously variable DIS based on the three above-noted temperatures, $T_{so}$, $T_m$, and $T_s$, as further discussed in FIG. 16.

Figure 16:
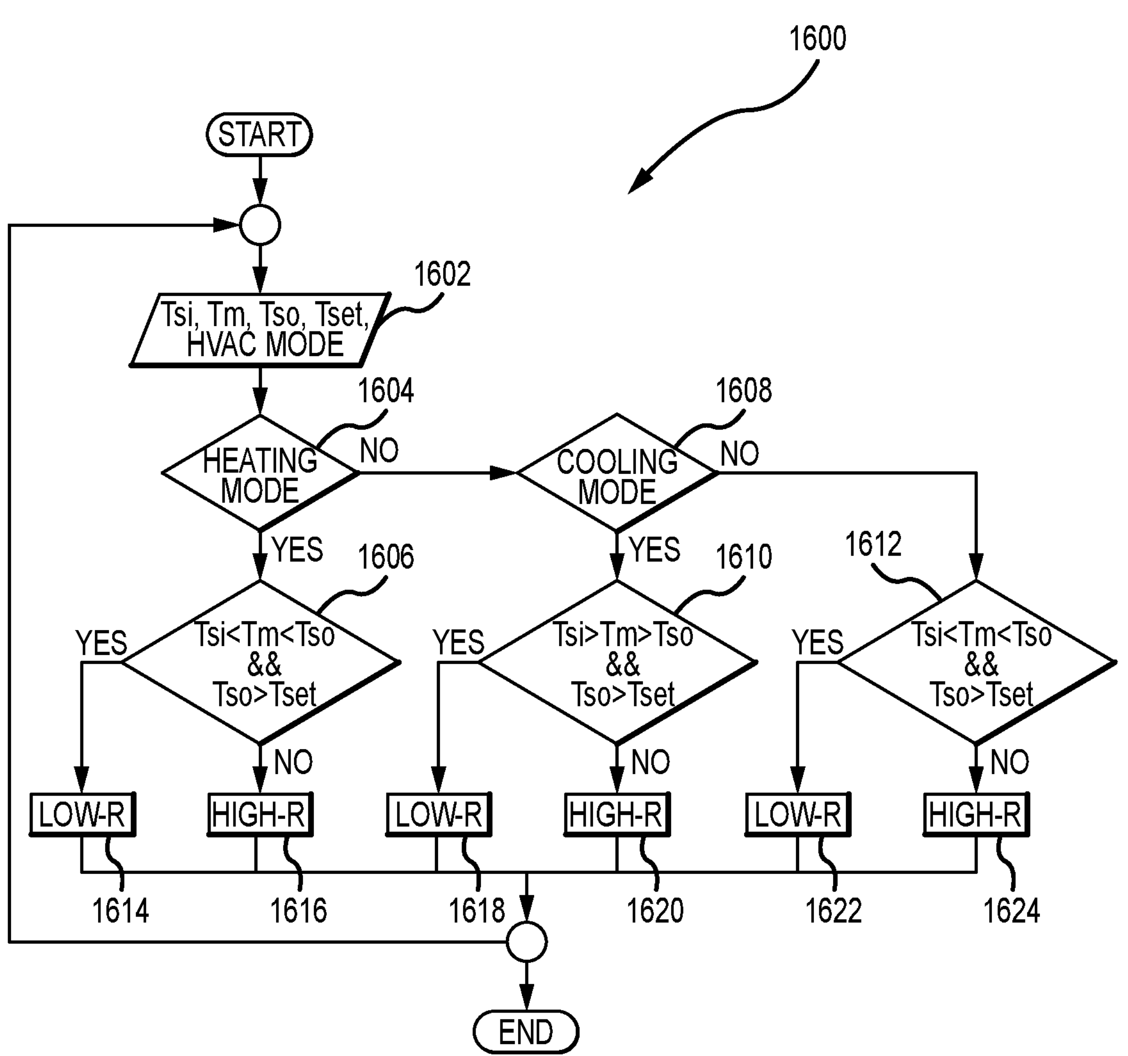
FIG. 16 illustrates an example ruleset for a control strategy for DIS according to an embodiment of the disclosure.

FIG. 16 illustrates a process flow 1600 in accordance with one or more implementations. Process flow 1600 may implement one or more aspects of the figures described herein. The method described in process flow 1600 may take the three above-noted temperatures (i.e., $T_{so}$, $T_m$, and $T_{si}$) as well as an indoor setpoint temperature, $T_{set}$, as inputs (Block 1602). The controller may then determine an appropriate R-value based on the operation mode (e.g., decision block 1604 (heating mode) or decision block 1608 (cooling mode)). In some examples, the surface temperatures of different exterior walls may be different since the solar radiation incident on an exterior wall surface may vary based on its orientation, previously discussed in relation to FIGS. 11A-B and 13. Accordingly, in some embodiments, each wall or each wall section (e.g., where there are multiple wall sections facing the same direction), may be independently controlled.

As shown in FIG. 16, in the heating mode, if the middle temperature, $T_m$, is less than the outside temperature, $T_{so}$, but greater than the inside temperature, $T_{si}$, the R-value may be decreased, or set to, for instance, a low-R value (e.g., 1.0) as shown at Block 1614. However, if the middle temperature, $T_m$, does not meet this condition in the heating mode, then the R-value may be increased, or set to, for instance, a high-R value (e.g., 2.5) as shown at Block 1616.

In some cases, if the heating mode at decision block 1604 is 'No', and the cooling mode at decision block 1608 is 'Yes': if the middle temperature, $T_m$, is less than the internal temperature, $T_{si}$, but greater than the outside temperature, $T_{so}$, the R-value may be decreased, or set to, for instance, a low-R value (e.g., 1.0) as shown at Block 1618. However, if this condition is not met, then the R-value may be increased, or set to, for instance, a high-R value (e.g., 2.5) as shown at Block 1620.

In yet other cases, both the heating mode and the cooling mode at decision blocks 1604 and 1608, respectively, may be 'No', which may also be referred to as a dead band mode. In the dead band mode, if the middle temperature, $T_m$, is greater than the internal temperature, $T_{si}$, but lower than the outside temperature, $T_{so}$, and the outside temperature is greater than the setpoint temperature, $T_{set}$, the R-value may be decreased, or set to a low-R value (e.g., 1.0) as shown at Block 1622. However, if this condition is not met, the R-value may be increased, or set to, for instance, a high-R value (e.g., 2.5) as shown at Block 1624.

In this example, 1.0 and 2.5 are the only two R-values that the system may be set to. However, in a continuously variable DIS, Blocks 1614, 1618, and 1622 may be associated with any R-values less than the R-values associated with Blocks 1616, 1620, and 1624. Additionally, in some embodiments, further decision logic may be utilized to determine additional gradations of R-values than those shown.

FIG. 13 summarizes reported analysis results 1300-*a*, 1300-*b*, and 1300-*c*. In some examples, FIG. 13 may implement one or more aspects of the figures described herein. As seen, analysis results 1300 depict bar charts and line charts related to optimized R-value settings for a continuously variable DIS applied to South, West, North, and East walls of a building for three days in May (i.e., May 6, 16, and 24). In particular, the bar charts in FIG. 13 depict R-value settings (in SI units) over the course of different days in May for different walls of the same building, while the line charts depict temperature measurements (e.g., temperature outside the building, sol-air temperature) over time for each of the three days.

As seen, each representative day (i.e., May 6, 16, and 24) was split into 6 time slots, with each time slot spanning 4 hours. In this example, continuously variable DISs for all walls were set to switch to a low R-value for the entire daytime period between 8:00 and 16:00 on May 16$^{th}$. Similarly, the low R-value settings were selected for all the walls during the 8:00-12:00 period on May 24$^{th}$, but only for the East, South, and North walls during the 4-hour periods from 12:00-16:00 hours. Further, low R-value settings were selected for the East and North walls during the 4-hour period from 16:00-20:00 hours. For May 6$^{th}$, unlike the case during May 16$^{th}$ and 24$^{th}$, the continuously variable DIS layers for all the walls were set at the high thermal resistance R-value during all the periods, save for the West wall during the 4-hour period from 16:00 to 20:00 hours.

In FIG. 13, the optimization results show that continuously variable DIS R-value settings changed significantly for each wall orientation during May 16$^{th}$ and 26$^{th}$ but only slightly during May 6$^{th}$. It should be noted that the period of 8:00-16:00 coincided with the time of the day when the building was occupied and had high internal gains. In some cases, heat gains may be associated with a plurality of factors, including equipment, lighting, and people. Due to these high internal heat gains, a GA-based optimizer opted to set the continuously variable DIS layers at their lowest thermal resistance value in order to allow the excess heat gains trapped indoors to be released outdoors through the building envelope. It should be noted that sol-air temperature combines the effects of both the ambient temperature and the incident solar radiation on the walls. Since during May 16$^{th}$ and 24$^{th}$, the sol-air temperature remained low during the occupied hours (8:00 to 16:00), the GA-based optimizer was configured to set the continuously variable DIS layers at their lowest R-value, which allowed the outdoors to act as a sink for indoor heat gains.

Additionally, when the sol-air temperature was high, the continuously variable DIS layers were set at their high R-value to prevent additional heat gains from outdoors, as was the case for May 6$^{th}$ during the occupied period. Therefore, and even though the internal heat gains in the building were high, the walls with continuously variable DIS layers were not able to release this excess heat, since the sol-air temperature during the same time was also high. During these periods, the GA-based optimization determined that a highly insulated building envelope may ensure that the cooling thermal load is not increased further by the high sol-air temperatures. This same behavior can also be noted for the West wall on May 24$^{th}$. Indeed, the increase in the sol-air temperature on the West facing wall after 12:00 prevented the optimizer from setting the continuously variable DIS layers for the West wall to a low R-value while the continuously variable DIS layers in the other walls were switched to lower R-value settings.

While the opportunity of energy use and cost savings associated with the application of continuously variable DISs may be evident from the results obtained using optimization controls, it is nonetheless important to compare these results to those obtained from a 2-Step control.

Figure 14:
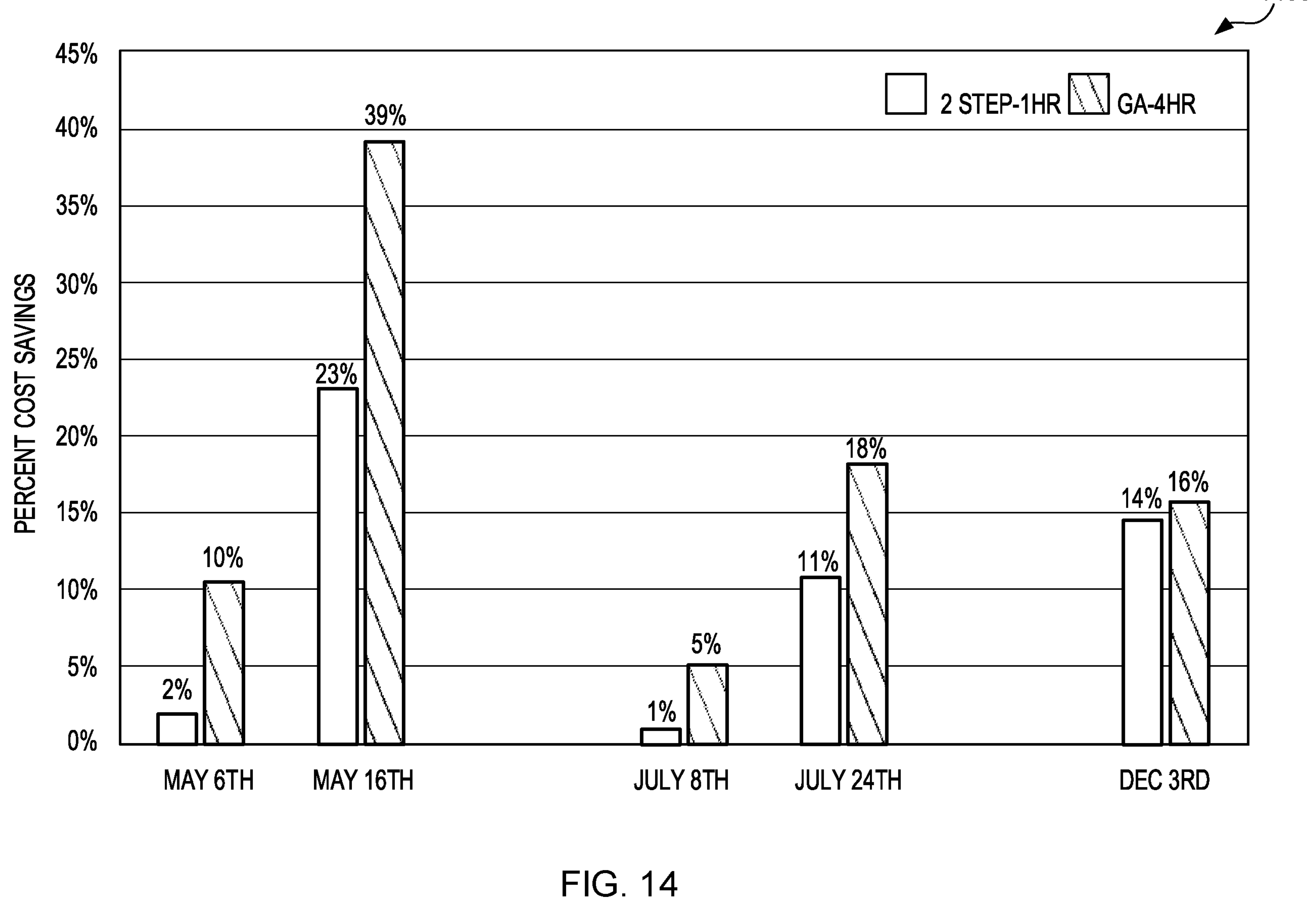
FIG. 14 provides a summary of the comparative analysis results for a location over different days in a year, in accordance with one or more implementations.

FIG. 14 provides a summary graph 1400 of the comparative analysis results for five representative days (i.e., two days for the swing season, two days for the cooling season, and one day for the heating season). The comparative analysis was carried out using 4-hr periods for the GA-based optimization with the ability to passively pre-cool the building, and 1-hr periods for the 2-Step control.

As seen in FIG. 14, the continuously variable DIS settings may outperform the 2-Step controls for all the five days considered in the analysis.

FIG. 19 illustrates some proposed designs for DIS prototypes 1900 and their application to insulate exterior walls, roofs or ceilings, as well as windows. The developed prototypes 1900 can be constructed on site or using prefabricated panels that can be easily installed using the current construction practices for both new and existing buildings. The various applications/configurations showing the placement of the DIS prototypes 1900 have been represented using hatched shading in FIG. 19.

As illustrated, configuration (a) is directed to one possible design for the DIS installed on the ceiling of a building. Further, configuration (b) is directed to an alternate design for a DIS installed on the sloped roof of a building. In some cases, a DIS may also be installed within a wall cavity of a building, as seen in configuration (c). Configuration (d) depicts a DIS installed between the interior and exterior walls of a building, for instance, in the middle of a wall cavity of a building. Configuration (e) is directed to another possible configuration for a DIS installed adjacent to an interior wall, but still within the wall cavity of a building. Lastly, configuration (f) is directed to a possible design for a DIS installed on a window of a building.

FIGS. 20A, 20B, 20C, and 20D illustrate four non-limiting examples of applications of the herein-disclosed continuously variable DIS. In particular, FIGS. 20A-D illustrate dynamic transparent insulation systems 2000, which may be examples of a continuously variable DIS. In some embodiments, aspects of the present disclosure may relate to enhancing the thermal performance of windows via the use of DISs. In some examples, the DISs may be adapted to change their heat transmission coefficient (U-value) and/or solar heat gain coefficient (SHGC). In some cases, such DISs, when applied as internal attachments to windows, can be operated using rule-based controls to optimize the overall energy performance of buildings. In some embodiments, the overall thermal resistance (i.e., overall R-value) of windows may be dynamically changed using DISs. In some cases, the thermal performance of a window may be modeled using one or more components of the window, such as glazing, gaps, frames, dividers, and shading devices. Further, window properties such as glass-to-glass resistance, thickness, thermal conductivity, transmittance, and glazing reflectance using the window rated U-value (i.e., inverse of R-value) and SHGC value may also be used to model the thermal performance of windows.

In some cases, insulated shade systems may comprise one or more insulation baffles, also referred to as insulation layers or fins, that can be synchronously rotated at a desired rotation angle, $\theta_i$, using a rule-based or optimized set of controls. Insulation baffles may be composed of low thermal materials, such as vacuum insulated panels, aerogels, polystyrene, polyurethane, or any other applicable material. In some other cases, transparent insulation materials may be used to manufacture insulation baffles.

FIG. 20A illustrates a dynamic transparent insulation system 2000-*a* comprising fins 2002-*a* and a smart window 2006-*a*, where the fins 2002-*a* are shown in (a) closed and (b) open positions. In some cases, fins 2002-*a* may be similar or substantially similar to the fins 102 in FIG. 1. Further, fins 2002-*a* may also be referred to as dynamic insulation blinds for the purposes of this disclosure. As shown in configuration (b), fins 2002-*a* may be rotated at a desired rotation angle 2009 ($\theta_i$) in order to change the R-value of the dynamic transparent insulation system 2000-*a*. In some embodiments, smart window 2006-*a* may be an example of a window comprising a smart film or a smart glass. In some cases, smart glass may refer to a glass or glazing whose light transmission properties may be altered upon application of light, voltage, heat, etc. In some cases, a smart glass may change from transparent to translucent or vice versa by changing the amount of light that can pass through it. In some examples, a smart glass may be adapted to block certain wavelengths of light (e.g., 620-750 nanometers (nm)) while allowing others (e.g., 380-600 nm) to pass through. In other cases, a smart glass may block a portion of incident radiation (e.g., 50% of incident power), regardless of frequency or wavelength. In some cases, the portion of blocked radiation may be varied, for instance, by adjusting the voltage or another parameter.

FIG. 20B shows a dynamic transparent insulation system 2000-*b* comprising dynamic insulation blinds (or fins 2002-*b*) combined with an automated shade 2015-*a* for a retrofit configuration. Similar to FIG. 20A, the fins 2002-*b* are shown in (a) closed and (b) open positions. In some examples, automated shade 2015-*a* of the dynamic transparent insulation system 2000-*b* may also be switched between (a) closed and (b) open positions. In the (a) closed configuration, the R-value of the dynamic transparent insulation system 2000-*b* is at its highest value. In some cases, the R-value may be decreased by increasing the insulation angle between fins 2002-*b*, as shown in (b). Additionally or alternatively, in configuration (b), the automated shade 2015-*a* may also be opened by an angle, which may be the same as or different to the insulation angle between fins 2002-*b* in the open position. As illustrated, the dynamic transparent insulation system 2000-*b* also includes a window 2006-*b*, which may or may not be an example of a smart window (i.e., comprise a smart window film). In some embodiments, the automated shades 2015-*a* themselves may be made of dynamic, but opaque, insulation systems. In some cases, a retrofit configuration may serve to minimize energy costs by allowing a user to control both the R-value and solar heat gain coefficient (SHGC).

In some embodiments, such as for new window installations, dynamic and transparent insulation systems may be integrated between two glazing layers, as shown in FIGS. 20C and 20D. In the configuration of FIG. 20C, one of the glazing layers may be smart or equipped with a smart film, further described below.

FIG. 20C shows a dynamic transparent insulation system 2000-*c* integrated in a window with a smart glazing layer (i.e., smart window or smart glass), where the fins 2002-*c* are shown in (a) closed and (b) open positions. In some cases, the window in dynamic transparent insulation system 2000-*c* may comprise one or more insulation blinds or fins 2002-*c* installed between its panels. For instance, insulation blinds or fins 2002-*c* may be positioned between a clear glass 2007-*a* on one side (i.e., to the left in the figure), and a window 2006-*c* comprising a smart window film on an opposing side (i.e., to the right in the figure).

FIG. 20D shows dynamic transparent insulation system 2000-*d* integrated in a window with clear glazing layers (e.g., clear glass 2007-*b*) combined with a conventional automated shade 2015-*b*, where the fins 2002-*d* and automated shade 2015-*b* are shown in (a) closed and (b) open positions. In the configuration of FIG. 20D, both glazing layers may be clear (or low emissivity). In other cases, one of the glazing layers may comprise a smart film, such as the smart film in window 2006-*a* in FIG. 20A. Thus, as seen in FIG. 20D, a dynamic transparent insulation system may comprise fins 2002-*d* installed (or positioned) between glazing layers or clear glass panels 2007-*b*. Further, the dynamic transparent insulation system 2000-*d* may comprise one or more automated shades 2015-*b* installed over a window integrated with the system. While the automated shade 2015-*b* is configured to be lowered (i.e., in the (a) closed position) and raised (i.e., in the (b) open position), in some cases, the automated shade 2015-*b* may be similar or substantially similar to the automated shade 2015-*a* in FIG. 20B. For instance, the automated shade 2015-*b* may include a rotatable (or angle adjustable) dynamic, but opaque, insulation system.

Figure 21B:
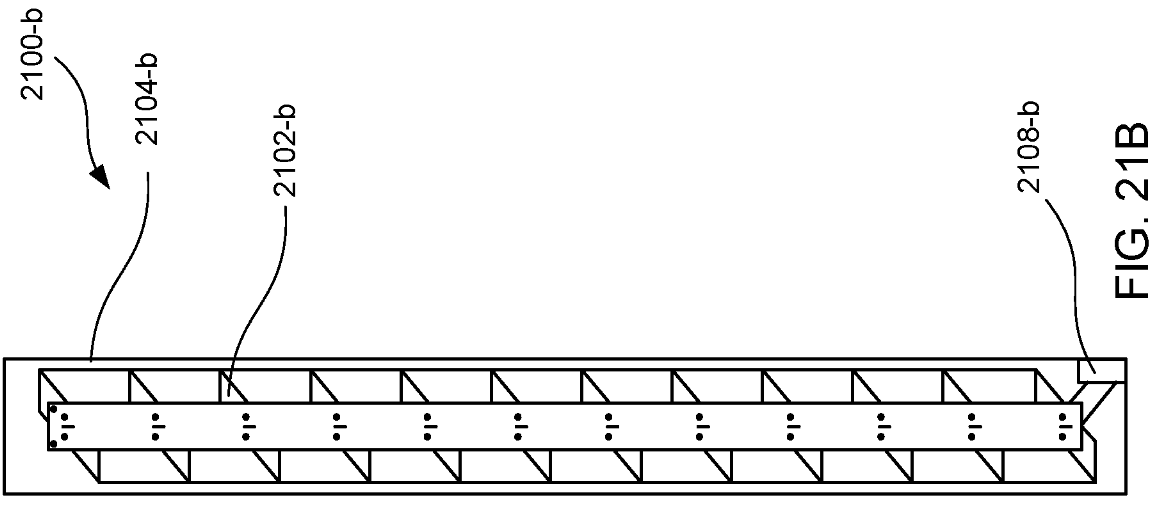
FIGS. 21A and 21B illustrate insulation systems suitable for wall panels with motors located on side walls according to an embodiment of the disclosure.
Figure 21A:
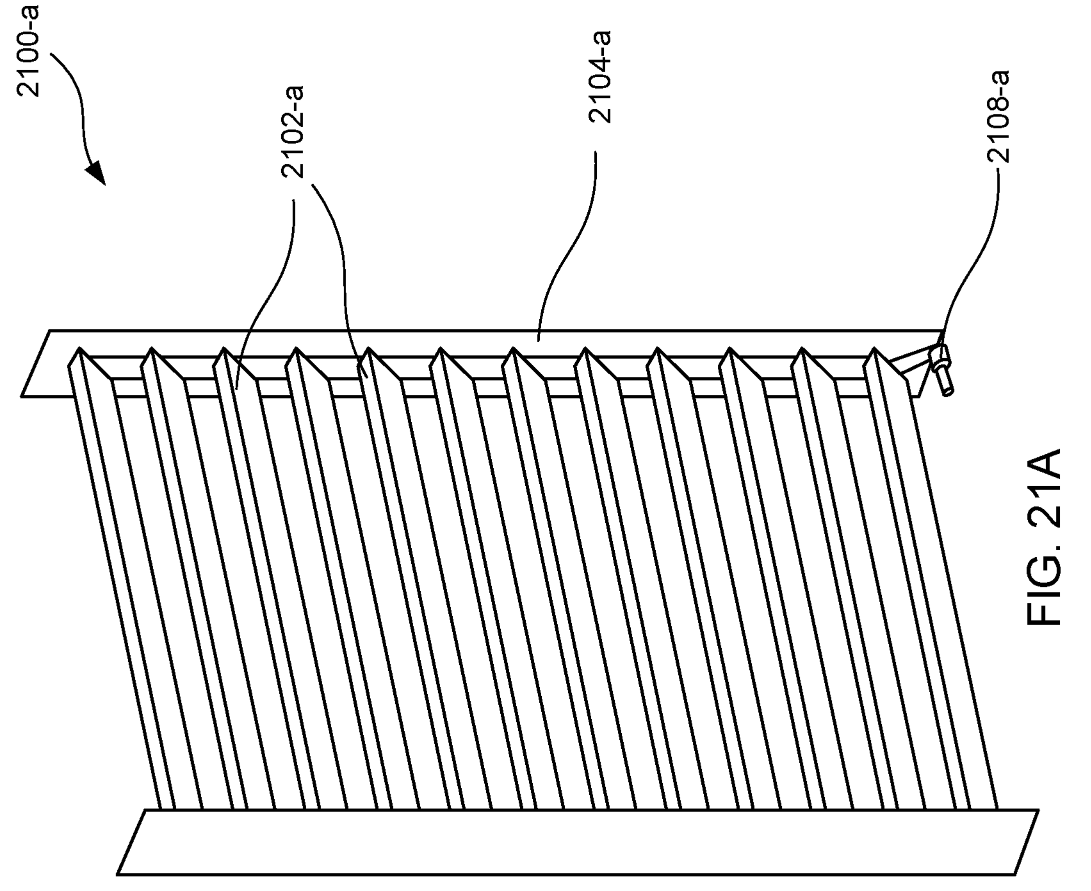

FIGS. 21A and 21B illustrate example motor placements for a DIS panel 2100 (i.e., DIS 2100-*a*, DIS 2100-*b*) suitable for wall panels. FIG. 21A illustrates a perspective view of the DIS 2100-*a*, whereas FIG. 21B illustrates a side view of the DIS panel 2100-*b*. As seen, DIS 2100-*a* comprises one or more insulation layers or fins 2102-*a*, which may be similar to the fins 102 in FIG. 1. Insulation layers or fins 2102-*a* may be attached to one or more side wall panels 2104 via fasteners or any other applicable means. Furthermore, DIS 2100-*a* may comprise a motor 2108-*a* located at an edge (e.g., lower edge, upper edge) of a sidewall panel 2104, such as sidewall panel 2104-*a*. In some embodiments, the motor 2108-*a* may be used to drive an actuator, where the actuator may be used to set the angle of fins 2102-*a*.

Similar to the DIS 2100-*a*, DIS 2100-*b* comprises one or more insulation layers or fins 2102-*b* attached to one or more side wall panels 2104, such as sidewall panel 2104-*b*. Furthermore, the insulation angle of fins 2102-*b* may be controlled using a motor 2108-*b* located on an edge of the sidewall panel 2104-*b*.

Figures 22A, 22B, 22C:
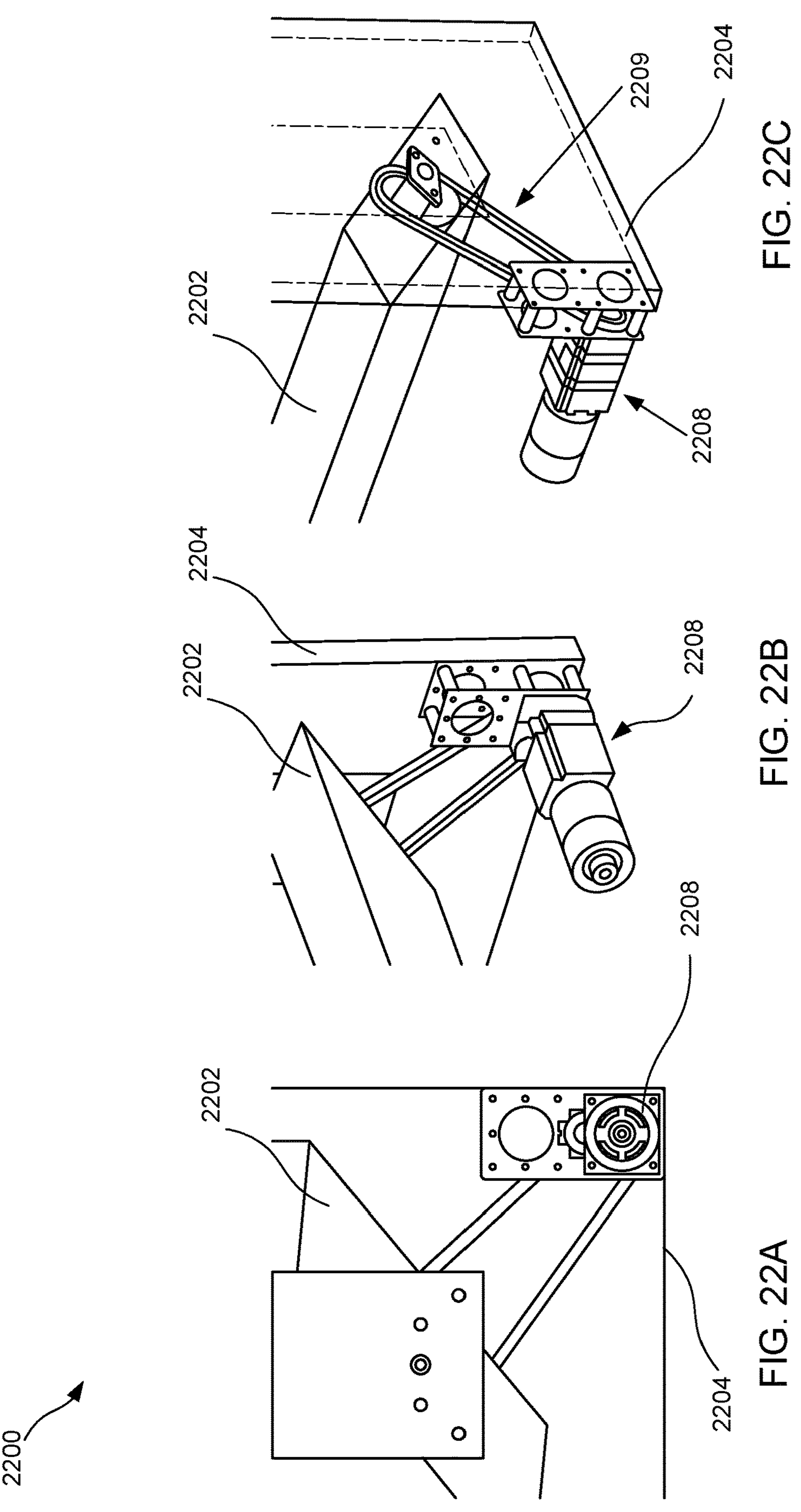
FIGS. 22A, 22B, and 22C illustrate a motor used to drive an actuator to set angles of the insulation layers according to an embodiment of the disclosure.

FIGS. 22A, 22B, and 22C illustrate details of a DIS 2200 panel. In some cases, DIS 2200 panel may comprise a motor-actuator unit 2208 adapted for varying insulation layer angles. In some cases, FIGS. 22A-C may implement one or more aspects of the figures described herein. For instance, motor-actuator unit 2208 may comprise one or more aspects of motor 108 previously described in relation to FIGS. 1A and/or 1B.

As seen, DIS 2200 panel comprises an insulation layer or fin 2202 attached to a sidewall panel 2204 via fasteners or any other applicable means. The motor-actuator unit 2208 may be configured to vary the insulation angle of fin 2202 by driving a belt 2209 or a chain connecting the motor-actuator unit to the fin 2202. FIGS. 22A-C illustrate fin 2202 in a partially open position, implying a lower R-value than a fully closed or vertical position.

Figures 23A, 23B, 23C:
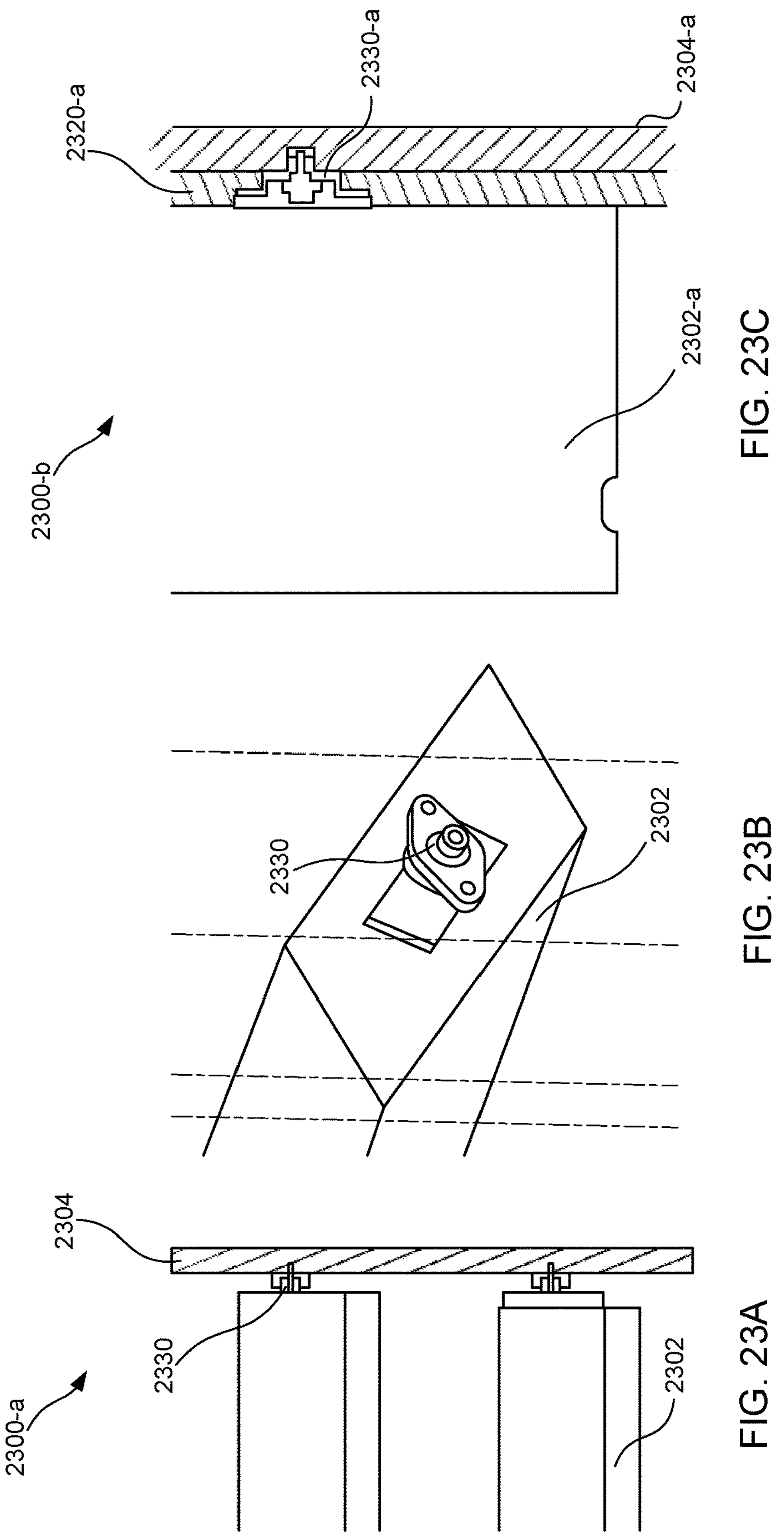
FIGS. 23A, 23B, and 23C illustrate connectors with insulation layers, included furred insulation, according to an embodiment of the disclosure.

FIGS. 23A and 23B illustrate a non-limiting example of a DIS 2300-*a* panel, which may be an example of a DIS described throughout this disclosure, comprising one or more connectors 2330 for fastening insulation layers or fins 2302 to a side wall panel 2304. Further, FIG. 23C illustrates an alternate embodiment of a DIS 2300-*b* panel utilizing furring or furred insulation. FIGS. 23A-C may implement one or more aspects of the figures described herein, including at least FIGS. 1A-B, and 22A-C. In some cases, the DIS 2300-*a* and/or 2300-*b* panels may include connectors 2330 comprising one or more fasteners, such as screws, through screws, bolts, etc., for coupling the insulation layers or fins 2302 to the side wall panel 2304. DIS 2300 panels may be examples the construction details of a continuously variable DIS described throughout this disclosure.

In some cases, DIS 2300-*b* panel may also be adapted for use with furring 2320 used for insulation installations. Furring, also referred to as furring strips, mounting strips, or strapping, may be thin strips of wood, metal, or any other applicable material, and may be used for building construction. In some cases, furring may be used to level or raise a surface of another material (e.g., to prevent dampness), make space for insulation, or level and resurface ceilings and/or walls. For example, in some cases, insulation may be installed in a channel formed between adjacent furring strips (e.g., wood furring) affixed to a wall surface.

In some embodiments, furring 2320-*a* may be affixed to a side wall panel 2304, such as side wall panel 2304-*a*, using connector 2330-*a*. For instance, as illustrated, the side wall panel 2304-*a* comprises the furring 2320-*a* along at least one of its edges. Further, the connector 2330-*a* may also be used to couple insulation layer or fin 2302-*a* to the side wall panel 2304-*a* (e.g., by carving the connector 2330-*a* through the furring 2320-*a*). In such cases, the connector 2330-*a* may be surrounded by the furring 2320-*a* on its top and bottom, the insulation layer or fin 2302-*a* on one side (e.g., left in the figure), and the wall panel 2304-*a* on an opposing side (e.g., right in the figure).

Figure 24:
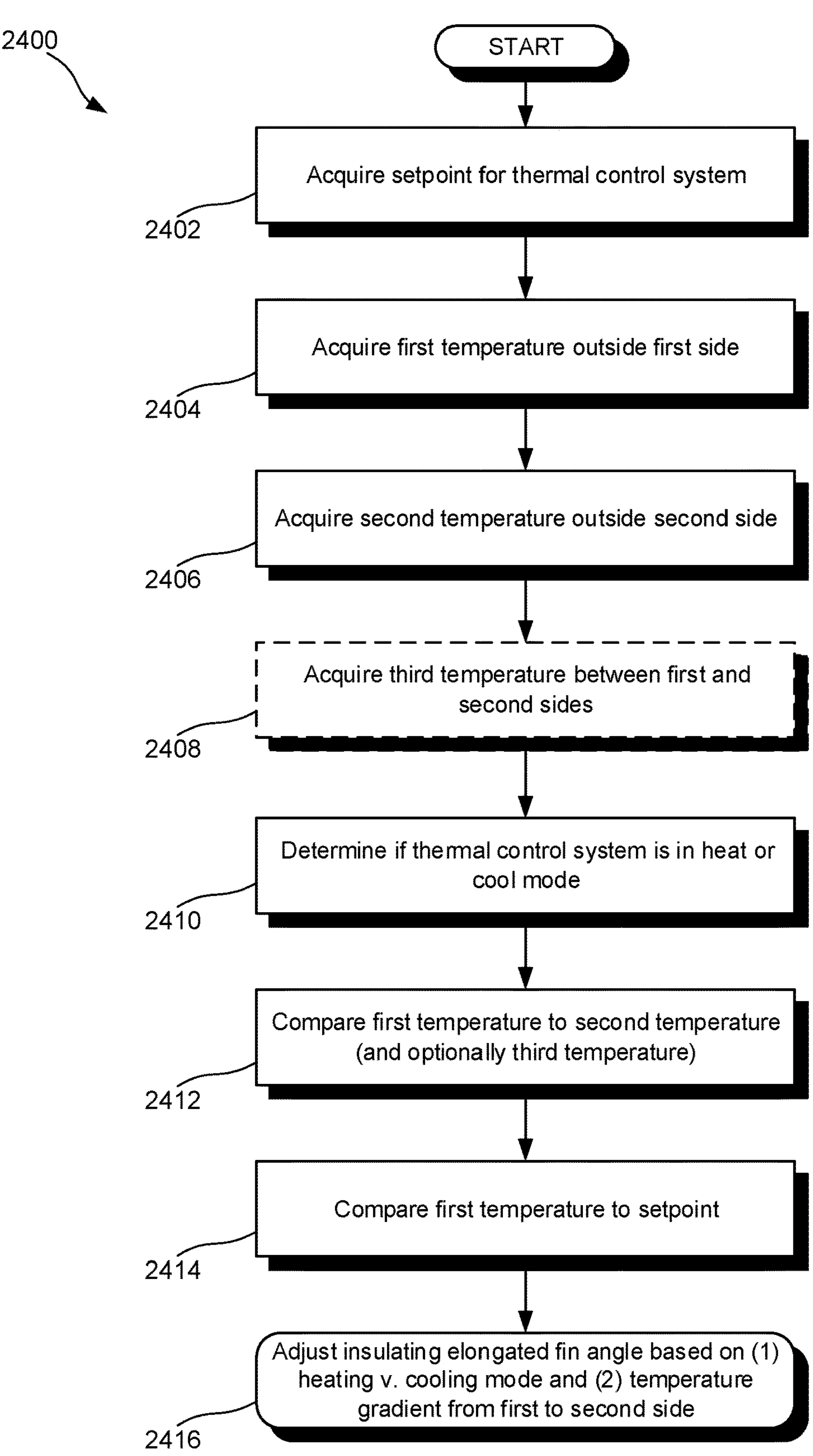
FIG. 24 illustrates a process flow for a DIS for a switchable building envelope according to an embodiment of the disclosure.

FIG. 24 illustrates a process flow 2400 in accordance with one or more implementations. Process flow 2400 may implement one or more aspects of the figures described herein, including at least FIG. 16. The method described in process flow 2400 may acquire a setpoint temperature for a thermal control system at block 2402. The setpoint temperature may be an indoor setpoint temperature, $T_{set}$. Further, at block 2404, the thermal control system may acquire a first temperature outside a first side (e.g., interior wall surface). In other words, at block 2404, the thermal control system may acquire the inside temperature, $T_{si}$, of a building comprising the thermal control system. Next, at block 2406, a second temperature outside a second side (e.g., exterior wall surface) may be acquired, where the second temperature may comprise the outside temperature, $T_{so}$.

Optionally, at block 2408, a third temperature (e.g., middle temperature, $T_m$) between the first and second sides of the wall panel may be acquired. At block 2410, the method may comprise determining if the thermal control system is in a heating or cooling mode. In some cases, at block 2412, the first temperature (i.e., acquired at block 2404) may be compared to the second temperature (i.e., acquired at block 2406), and optionally the third temperature (i.e., acquired at block 2408). Further, at block 2414, the first temperature may also be compared to the setpoint temperature acquired at block 2402.

At 2416, the method described in process flow 2400 may comprise adjusting an insulated fin angle based in part on determining if the thermal control system is in a heating or cooling mode, previously determined at block 2410. Additionally, or alternatively, the insulated fin angle may be adjusted based on a temperature gradient from the first side to the second side of the wall panel. In some examples, the surface temperatures of different exterior walls may be different since the solar radiation incident on an exterior wall surface may vary based on its orientation. Accordingly, in some embodiments, each wall or each wall section (e.g., where there are multiple wall sections facing the same direction), may be independently controlled.

In some embodiments, the thermal resistance or R-value may be determined based on the operation mode (heating or cooling mode). In the heating mode, if the third or middle temperature, $T_m$, is less than the second or outside temperature, $T_{so}$, but greater than the first or inside temperature, $T_{si}$, the R-value may be decreased by increasing the insulated fin angle. However, if the middle temperature, $T_m$, does not meet this condition in the heating mode, then the R-value may be increased by decreasing the insulated fin angle.

In some other cases, if the thermal control system is in the cooling mode and the middle temperature, $T_m$, is less than the internal temperature, $T_{si}$, but greater than the outside temperature, $T_{so}$, the R-value may be decreased by increasing the insulated fin angle. Similar to the heating mode, if this condition is not met, then the R-value may be increased by decreasing the insulated fin angle.

Thus, in a continuously variable DIS, insulated elongated fin angles may be adjusted to increase or decrease the thermal resistance or R-value of walls, which may serve to optimize energy consumption.

Figure 18:
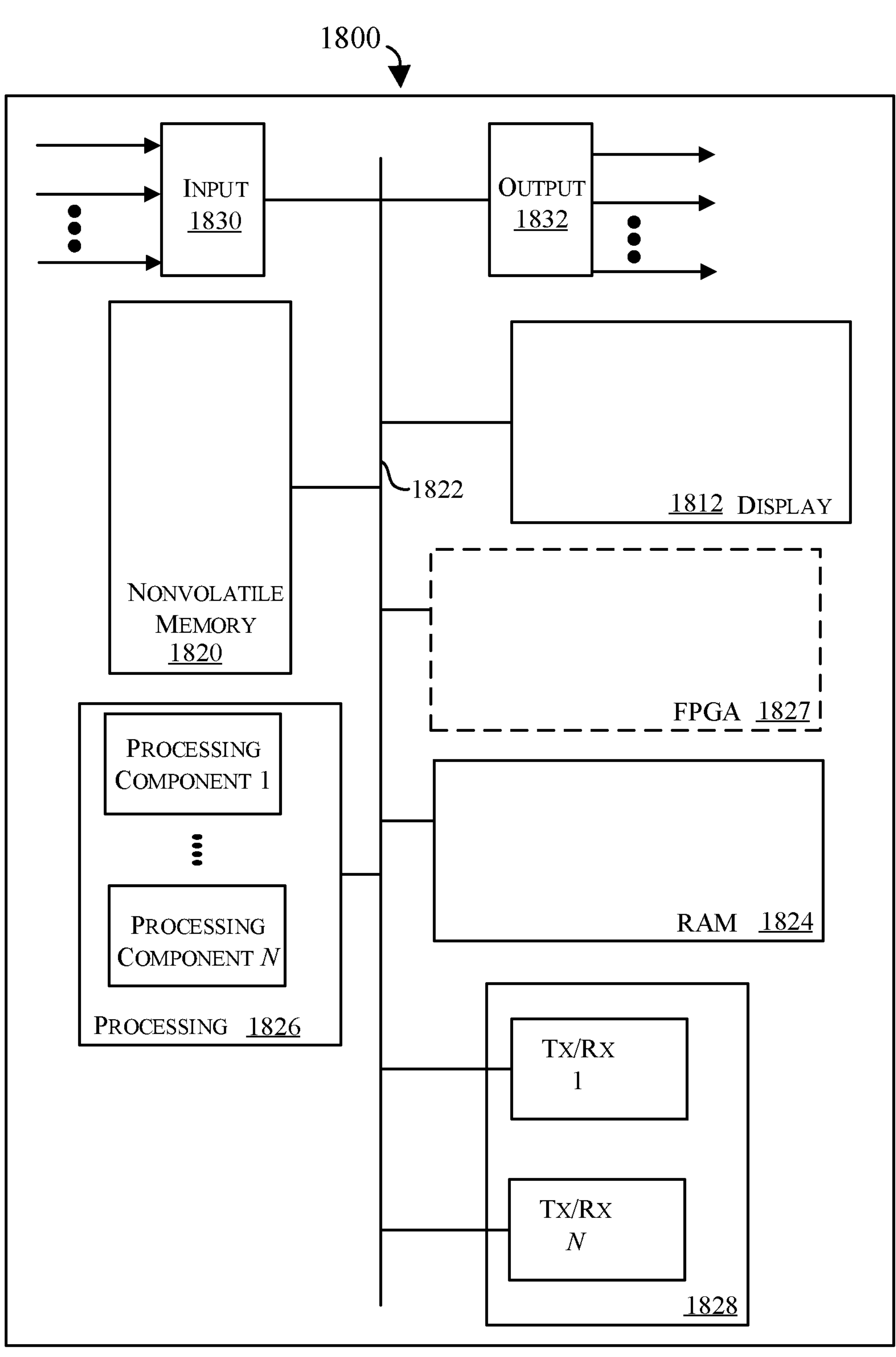
FIG. 18 is a block diagram depicting physical components that may be utilized to realize a controller according to an embodiment of the disclosure.

The methods described in connection with the embodiments disclosed herein may be embodied directly in hardware, in processor-executable code encoded in a non-transitory tangible processor readable storage medium, or in a combination of the two. Referring to FIG. 18 for example, shown is a block diagram depicting physical components that may be utilized to realize the controller 110 according to an exemplary embodiment. As shown, in this embodiment a display portion 1812 and nonvolatile memory 1820 are coupled to a bus 1822 that is also coupled to random access memory ("RAM") 1824, a processing portion (which includes N processing components) 1826, an optional field programmable gate array (FPGA) 1827, and a transceiver component 1828 that includes N transceivers. Although the components depicted in FIG. 18 represent physical components, FIG. 18 is not intended to be a detailed hardware diagram; thus, many of the components depicted in FIG. 18 may be realized by common constructs or distributed among additional physical components. Moreover, it is contemplated that other existing and yet-to-be developed physical components and architectures may be utilized to implement the functional components described with reference to FIG. 18.

Display portion 1812 generally operates to provide a user interface for a user, and in several implementations, the display is realized by a touchscreen display. In general, the nonvolatile memory 1820 is non-transitory memory that functions to store (e.g., persistently store) data and processor-executable code (including executable code that is associated with effectuating the methods described herein). In some embodiments for example, the nonvolatile memory 1820 includes bootloader code, operating system code, file system code, and non-transitory processor-executable code to facilitate the execution of a method described with reference to FIGS. 16 and/or 24 described further herein.

In many implementations, the nonvolatile memory 1820 is realized by flash memory (e.g., NAND or ONENAND memory), but it is contemplated that other memory types may be utilized as well. Although it may be possible to execute the code from the nonvolatile memory 1820, the executable code in the nonvolatile memory is typically loaded into RAM 1824 and executed by one or more of the N processing components in the processing portion 1826.

The N processing components in connection with RAM 1824 generally operate to execute the instructions stored in nonvolatile memory 1820 to enable control of a continuously variable DIS. For example, non-transitory, processor-executable code to effectuate the methods described with reference to FIGS. 16 and/or 24 may be persistently stored in nonvolatile memory 1820 and executed by the N processing components in connection with RAM 1824. As one of ordinarily skill in the art will appreciate, the processing portion 1826 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1826 may be configured to effectuate one or more aspects of the methodologies described herein (e.g., the method described with reference to FIG. 16 or FIG. 24). For example, non-transitory processor-readable instructions may be stored in the nonvolatile memory 1820 or in RAM 1824 and when executed on the processing portion 1826, cause the processing portion 1826 to perform a method of adjusting the R-value of a continuously variable DIS. Alternatively, non-transitory FPGA-configuration-instructions may be persistently stored in nonvolatile memory 1820 and accessed by the processing portion 1826 (e.g., during boot up) to configure the hardware-configurable portions of the processing portion 1826 to effectuate the functions of the controller 110.

The input component 1830 operates to receive signals (e.g., data from thermal sensors 112, 114, 116) that are indicative of one or more aspects of the temperatures inside and outside the continuously variable DIS. The signals received at the input component may include, for example, temperature data. The output component generally operates to provide one or more analog or digital signals to effectuate an operational aspect of the controller 110. For example, the output portion 1832 may provide the controller 110 instructions to the actuators 108 described with reference to FIG. 1.

The depicted transceiver component 1828 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as “processing,” “computing,” “calculating,” “determining,” and “identifying” or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the present invention may take the form of a computer program product embodied in one or more computer readable medium(s) having computer readable program code embodied thereon.

As used herein, the recitation of “at least one of A, B and C” is intended to mean “either A, B, C or any combination of A, B and C.” The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A structural insulation assembly having a variable insulating value and being incorporated into a thermal envelope of a structure, the assembly comprising:
- a wall comprising a first surface,
- a second surface and
  - a cavity between the first and second surfaces and at least partially filled with a gas;
  - a plurality of insulating elongated fins, each fin comprising thermally insulating foam disposed between the first surface and the second surface of the wall and fixed to distinct rotational axes, the rotational axes being parallel to each other, the plurality of elongated fins being continuously rotatable between a closed position, where the plurality of elongated fins are substantially vertical, and a fully open position, where the plurality of elongated fins are perpendicular to the first and second surfaces and parallel to each other;
  - an actuator coupled to the plurality of insulating elongated fins and controlling a rotational angle of the insulating elongated fins to effectuate the variable insulating value;
  - a motor operating the actuator, wherein the motor and the actuator are located external to the structure; and
  - a controller configured to control an R-value of the structural insulation assembly by passing instructions to the actuator dictating the angle of the insulating elongated fins, to maintain steady state heat flux between the first and second surfaces.

2. The structural insulation assembly of claim 1, further comprising one or more thermal sensors.

3. The structural insulation assembly of claim 2, wherein the one or more thermal sensors are in communication with the controller, and wherein the controller bases the angle of the fins on temperature data provided by the one or more thermal sensors.

4. The structural insulation assembly of claim 3, wherein one of the one or more thermal sensors is arranged in the cavity.

5. The structural insulation assembly of claim 1, wherein the first surface is part of an exterior of the structure.

6. The structural insulation assembly of claim 5, wherein the second surface is part of an interior of the structure.

7. The structural insulation assembly of claim 1, wherein the wall comprises at least a portion of a roof, ceiling, or floor.

8. The structural insulation assembly of claim 1, wherein the wall is a modification or addition to the thermal envelope of the structure.

9. The structural insulation assembly of claim 2, wherein the controller comprises processor-executable code encoded in a non-transitory tangible processor readable storage medium, the code, when executed by the controller, is configured to cause the controller to:
- determine whether a thermal control system for the structure is in a heating or cooling mode;
- compare a temperature outside the first surface and a temperature outside the second surface to a temperature provided by the one or more thermal sensors arranged in the cavity;
- compare a temperature outside the first surface to a setpoint temperature of an HVAC system;
- instruct the actuator to adjust the rotational angle of the insulating elongated fins in response to the heating or cooling mode, and the temperature comparisons.

10. A structural insulation assembly having a variable insulating value and being incorporated into a thermal envelope of a structure, the assembly comprising:
- a wall comprising a first surface,
- a second surface and
  - a cavity between the first and second surfaces and at least partially filled with a gas;
  - a plurality of insulating elongated fins disposed between the first surface and the second surface of the wall and fixed to distinct rotational axes, the rotational axes being parallel to each other, the plurality of elongated fins being continuously rotatable between a closed position, where the plurality of elongated fins are substantially vertical, and a fully open position, where the plurality of elongated fins are perpendicular to the first and second surfaces and parallel to each other;

an actuator coupled to the plurality of insulating elongated fins and controlling a rotational angle of the insulating elongated fins to effectuate the variable insulating value;

a motor operating the actuator, wherein the motor and the actuator are located external to the structure; and a controller configured to control an R-value of the structural insulation assembly by passing instructions to the actuator dictating the angle of the insulating elongated fins, to maintain steady state heat flux between the first and second surfaces.

* * * * *